(12) United States Patent
Liu et al.

(10) Patent No.: US 11,941,745 B2
(45) Date of Patent: *Mar. 26, 2024

(54) REFLECTION DENOISING IN RAY-TRACING APPLICATIONS

(71) Applicant: NVIDIA Corporation, Santa Clara, CA (US)

(72) Inventors: Shiqiu Liu, Santa Clara, CA (US); Christopher Ryan Wyman, Redmond, WA (US); Jon Hasselgren, Bunkeflostrand (SE); Jacob Munkberg, Skane (SE); Ignacio Llamas, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,132

(22) Filed: Jun. 28, 2022

(65) Prior Publication Data

US 2022/0327765 A1     Oct. 13, 2022

Related U.S. Application Data

(63) Continuation of application No. 16/935,431, filed on Jul. 22, 2020, now Pat. No. 11,373,359, which is a (Continued)

(51) Int. Cl.
*G06T 15/06* (2011.01)
*G06T 5/00* (2006.01)
(Continued)

(52) U.S. Cl.
CPC ............. *G06T 15/06* (2013.01); *G06T 5/002* (2013.01); *G06T 5/20* (2013.01); *G06T 15/506* (2013.01); *G06T 15/60* (2013.01); *G06T 2210/21* (2013.01)

(58) Field of Classification Search
CPC .......... G06T 5/002; G06T 5/20; G06T 15/06; G06T 15/506; G06T 15/60
See application file for complete search history.

(56) References Cited

U.S. PATENT DOCUMENTS

2016/0269723 A1* 9/2016 Zhou ..................... G06T 5/002
2017/0323471 A1* 11/2017 Chien .................... G06T 15/60

OTHER PUBLICATIONS

Colbert et al., BRDF-Shop: Creating Physically Correct Bidirectional Reflectance Distribution Functions, IEEE Computer Graphics and Applications, vol. 26, Issue 1, Jan. 2006, pp. 30-36 (Year: 2006).*

* cited by examiner

*Primary Examiner* — Charles Tseng
(74) *Attorney, Agent, or Firm* — Taylor English Duma L.L.P.

(57) ABSTRACT

Disclosed approaches may leverage the actual spatial and reflective properties of a virtual environment—such as the size, shape, and orientation of a bidirectional reflectance distribution function (BRDF) lobe of a light path and its position relative to a reflection surface, a virtual screen, and a virtual camera—to produce, for a pixel, an anisotropic kernel filter having dimensions and weights that accurately reflect the spatial characteristics of the virtual environment as well as the reflective properties of the surface. In order to accomplish this, geometry may be computed that corresponds to a projection of a reflection of the BRDF lobe below the surface along a view vector to the pixel. Using this approach, the dimensions of the anisotropic filter kernel may correspond to the BRDF lobe to accurately reflect the spatial characteristics of the virtual environment as well as the reflective properties of the surface.

20 Claims, 14 Drawing Sheets

Related U.S. Application Data continuation of application No. 16/355,214, filed on Mar. 15, 2019, now Pat. No. 10,776,985.

(60) Provisional application No. 62/718,923, filed on Aug. 14, 2018, provisional application No. 62/644,601, filed on Mar. 19, 2018, provisional application No. 62/644,386, filed on Mar. 17, 2018, provisional application No. 62/644,385, filed on Mar. 17, 2018.

(51) Int. Cl.
*G06T 5/20* (2006.01)
*G06T 15/50* (2011.01)
*G06T 15/60* (2006.01)

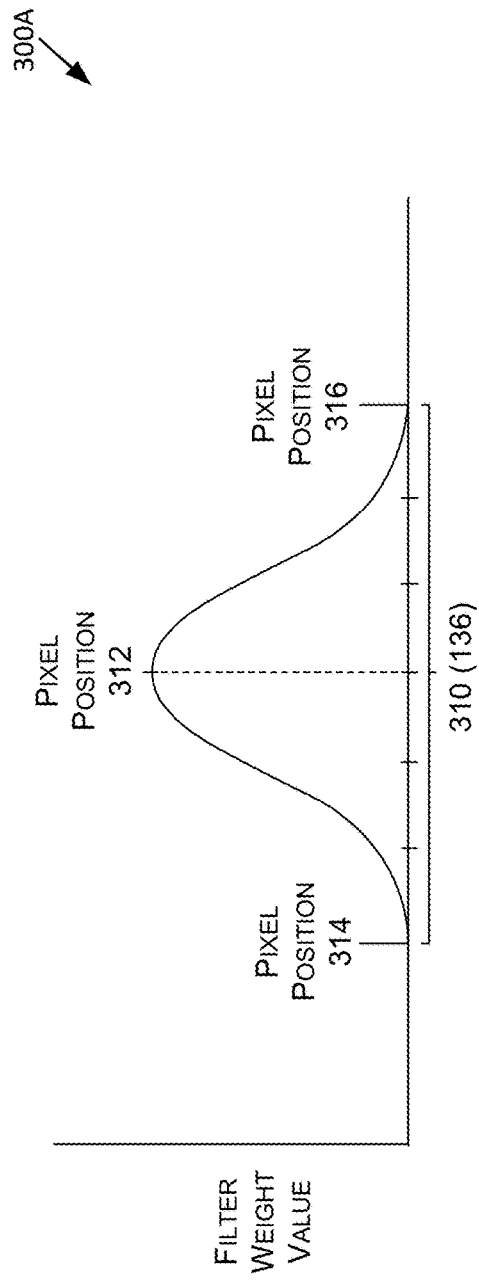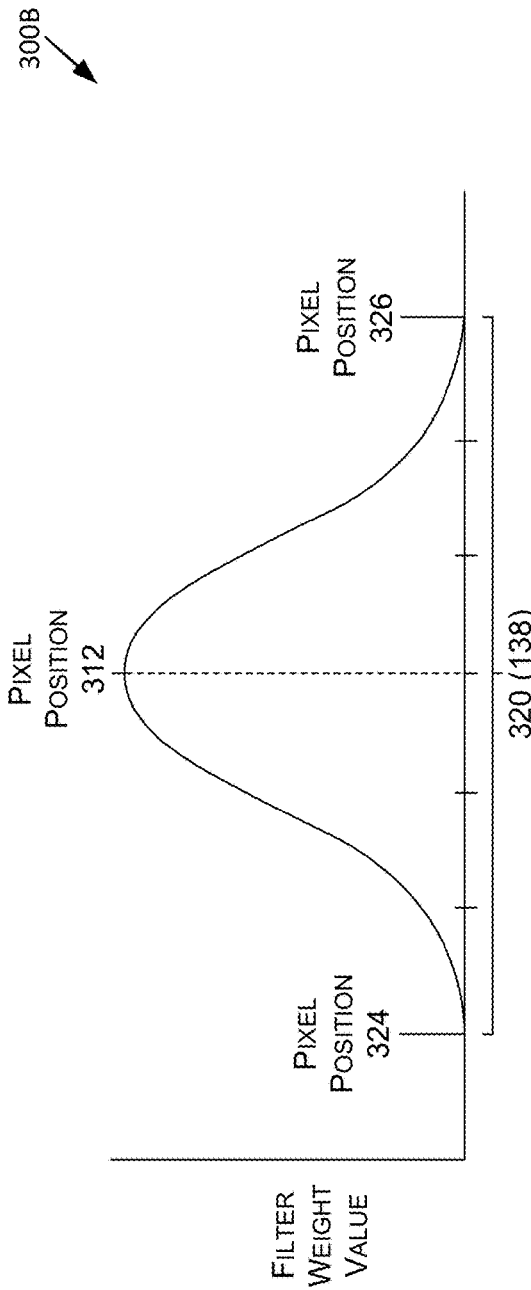

REFLECTION DENOISING IN RAY-TRACING APPLICATIONS

CROSS-REFERENCE TO RELATED APPLICATIONS

This application is a continuation of U.S. Non-Provisional application Ser. No. 16/935,431, filed Jul. 22, 2020, which is a continuation of U.S. Non-Provisional application Ser. No. 16/355,214, filed Mar. 15, 2019, now U.S. Pat. No. 10,776,985, issued Sep. 15, 2020, which claims the benefit of U.S. Provisional Application No. 62/644,385, filed on Mar. 17, 2018, which is hereby incorporated by reference in its entirety. This application also claims the benefit of U.S. Provisional Application No. 62/644,386, filed on Mar. 17, 2018, which is hereby incorporated by reference in its entirety. This application further claims the benefit of U.S. Provisional Application No. 62/644,601, filed on Mar. 19, 2018, which is hereby incorporated by reference in its entirety. This application further claims the benefit of U.S. Provisional Application No. 62/718,923, filed on Aug. 24, 2018. Each of these applications are hereby incorporated by reference in its entirety.

BACKGROUND

Ray-tracing may be used to render images by tracing a path of light in a virtual environment and simulating the effects of the light's encounters with virtual objects. Various applications of ray-tracing technology may simulate a variety of optical effects—such as shadows, reflections and refractions, scattering phenomenon, and dispersion phenomenon (such as chromatic aberration). With respect to rendering reflections using ray-tracing, conventional approaches use stochastic ray-tracing in which ray-traced camera and reflected rays are cast in a virtual environment to sample lighting conditions for a pixel. The lighting conditions may be combined and applied to the pixel in an image. To conserve computing resources, the rays may be sparsely sampled, resulting in a noisy render. The noisy render may then be filtered to reduce noise and produce a final render that approximates a render of a fully-sampled scene.

In order for the final render to accurately portray lighting conditions in the virtual environment after filtering, conventional approaches require a large number of ray-traced samples (e.g., hundreds of samples or more) for each pixel. Due to the large number of samples, the computational resources used for rendering the virtual environment may impose too great of a delay for real-time rendering applications, such as gaming. In one such approach, each surface is treated as a diffuse surface to compute an isotropic filter kernel without accounting for the directional nature of the surface. However, this may be a prominent feature of some surfaces, such as glossy surfaces. Thus, the size, shape, orientation and weights of the filter kernel may not accurately reflect the spatial characteristics of the virtual environment nor the reflective properties of the surface, which may cause over-blurring of the image in addition to an unrealistic blur pattern.

SUMMARY

Embodiments of the present disclosure relate to reflection denoising in ray-tracing applications. In particular, the present disclosure relates to approaches for denoising ray-traced reflections that may be cast by various types of surfaces, such as glossy surfaces. More specifically, the current disclosure relates to approaches for determining the dimensions and filter weights of a filter kernel that is applied to a pixel to denoise the ray-traced reflections in a graphically-rendered image.

Disclosed approaches may leverage the actual spatial and reflective properties of a virtual environment—such as the size, shape, and orientation of a bidirectional reflectance distribution function (BRDF) lobe of a light path and its position relative to a reflection surface, a virtual screen, and a virtual camera—to produce, for a pixel, an anisotropic kernel filter having dimensions and weights that accurately reflect the spatial characteristics of the virtual environment as well as the reflective properties of the surface. This may not only reduce the chance of over-blurring of the image, but also result in a more realistic blur pattern. In order to accomplish this, embodiments of the current system may compute geometry that corresponds to a projection of a reflection of the BRDF lobe below the surface along a view vector to the pixel. Using this approach, the dimensions of the anisotropic filter kernel may correspond to the BRDF lobe to accurately reflect the spatial characteristics of the virtual environment as well as the reflective properties of the surface.

BRIEF DESCRIPTION OF THE DRAWINGS

The present systems and methods for reflection denoising in ray-tracing applications is described in detail below with reference to the attached drawing figures, wherein:

FIG. 3A is a diagram illustrating an example of a graph of filter weight values that may be determined by fitting a distribution function to a first width of a filter along a first direction, in accordance with some embodiments of the present disclosure;

FIG. 3B is a diagram illustrating an example of a graph of filter weight values that may be determined by fitting a distribution function to a second width of a filter along a second direction, in accordance with some embodiments of the present disclosure;

DETAILED DESCRIPTION

Figure 1:
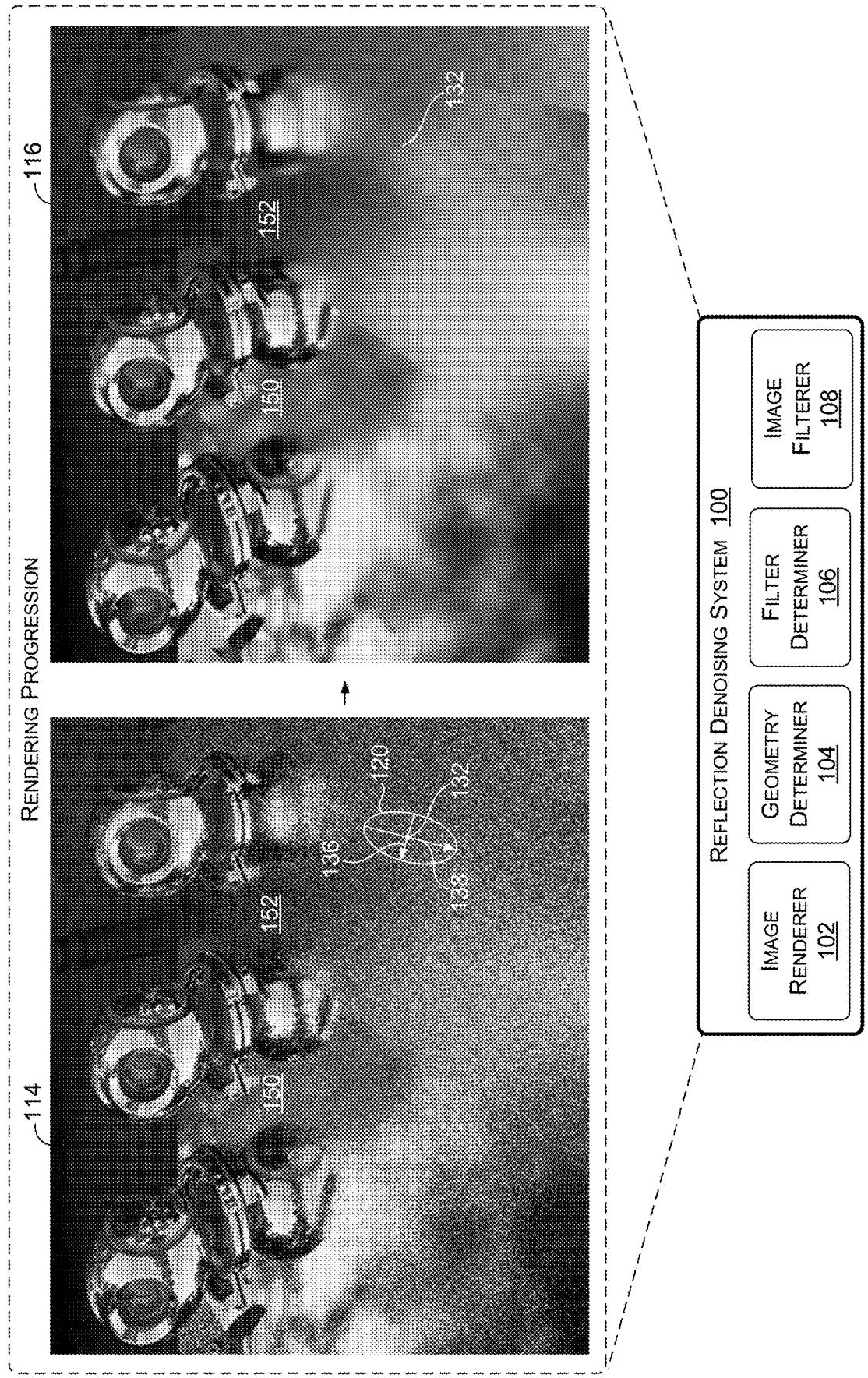
FIG. 1 is an example system diagram of a reflection denoising system, in accordance with some embodiments of the present disclosure.

The present disclosure relates to approaches for denoising ray-traced reflections cast by various types of surfaces, such as glossy surfaces. More specifically, the current disclosure relates to approaches for determining the size, shape, orientation, filter directions, and/or filter weights of a filter kernel that is applied to a pixel to denoise the ray-traced reflections in a graphically-rendered image.

In contrast to traditional approaches, disclosed approaches may leverage the actual spatial and reflective properties of a virtual environment—such as the size, shape, and orientation of a bidirectional reflectance distribution function (BRDF) lobe of a light path and its position relative to a reflection surface, a virtual screen, and a virtual camera—to produce, for a pixel, an anisotropic kernel filter having dimensions and weights that accurately reflect the spatial characteristics of the virtual environment as well as the reflective properties of the surface. This may not only reduce the chance of over-blurring of the image, but also results in a more realistic blur pattern.

In order to accomplish this, embodiments of the current system may compute geometry of the BRDF lobe. The geometry of the BRDF lobe may be used to compute geometry of a cross-section, at the virtual screen, that corresponds to a projection of a reflection of the BRDF lobe below the surface along a view vector to the pixel.

A size, orientation, and/or shape of the anisotropic filter kernel and corresponding filter weights of the filter may be determined from the geometry that corresponds to the cross-section. For example, the size of the anisotropic filter kernel may match the cross-section at the virtual screen, or may be adjusted based on other information, such as temporal ray-traced sample information from concurrent or preceding frames. Further, the filter weights may be determined by applying a distribution function, such as a Gaussian distribution function, along each filter direction of the anisotropic filter kernel. Using this approach, the dimensions of the anisotropic filter kernel may correspond to the BRDF lobe to accurately reflect the spatial characteristics of the virtual environment as well as the reflective properties of the surface.

In further examples, a specular reflection model may be employed to determine lighting condition data for a pixel (e.g., without sampling the BRDF lobe), even where a roughness value for a corresponding point on the surface is greater than zero (e.g., below a threshold value). The anisotropic filter kernel that is based on the BRDF lobe may be applied to the lighting condition data resulting in high quality reflections with reduced processing requirements. In further respects, where the BRDF lobe is sampled to determine the lighting condition data, the sampling may be biased as a function of the roughness value such that the BRDF lobe is not fully sampled. The anisotropic filter kernel may be based on the full BRDF lobe and applied to the lighting condition data resulting in high quality reflections with reduced processing requirements.

With reference to FIG. 1, FIG. 1 is an example system diagram of a reflection denoising system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the reflection denoising system 100 may be implemented on one or more instances of the computing device 1000 of FIG. 10.

The reflection denoising system 100 may include, among other things, an image renderer 102, a geometry determiner 104, a filter determiner 106, and an image filterer 108. The image renderer 102 may be configured to render images of virtual environments, such as a virtual environment 200 of FIGS. 2A-2E and FIG. 4. To render an image of a virtual environment, the image renderer 102 may employ the geometry determiner 104, the filter determiner 106, and the image filterer 108. The geometry determiner 104 may be configured to determine—for a point in a virtual environment—geometry that corresponds to a BRDF lobe associated with the point. The filter determiner 106 may be configured to determine—based at least in part on the geometry—at least one dimension (e.g., geometry) of a filter 120 (e.g., a spatial filter) and corresponding filter weights of the filter 120. The image renderer 102 may apply the filter 120 to a pixel 132 (e.g., at an initial pixel position of the filter 120) that corresponds to the point in the virtual environment to denoise an image 114 that is representative of the virtual environment. The image renderer 102 may similarly use the geometry determiner 104, the filter determiner 106, and the image filterer 108 to determine filters for other points in the virtual environment and corresponding pixels in the image 114 to produce the image 116. Thus, multiple filters may be used to denoise lighting condition data (e.g., only incoming reflection radiance) associated with the image 114 to produce the image 116 (e.g., at least one filter per pixel), and those filters may all be applied in a single draw call.

While the image renderer 102 is described as rendering the image 114, the various examples described herein are not intended to be limited to rendering the image 114. For example, the image 114 need not be fully rendered as shown. As an example, one or more portions of visual content of the image 114 and/or components thereof may be rendered (e.g., incoming radiance). The image filterer 108 may apply filters to image data representative of the one or more portions of visual content of the image 114 and/or components thereof to produce image data representative of the image 116. The image 114 is shown to illustrate noise that may be filtered in some examples of the present disclosure. Further, while the filter 120 is illustrated in FIG. 1, the image renderer 102 may or may not render an illustration of the filter 120 in the image 114.

Figure 2A:
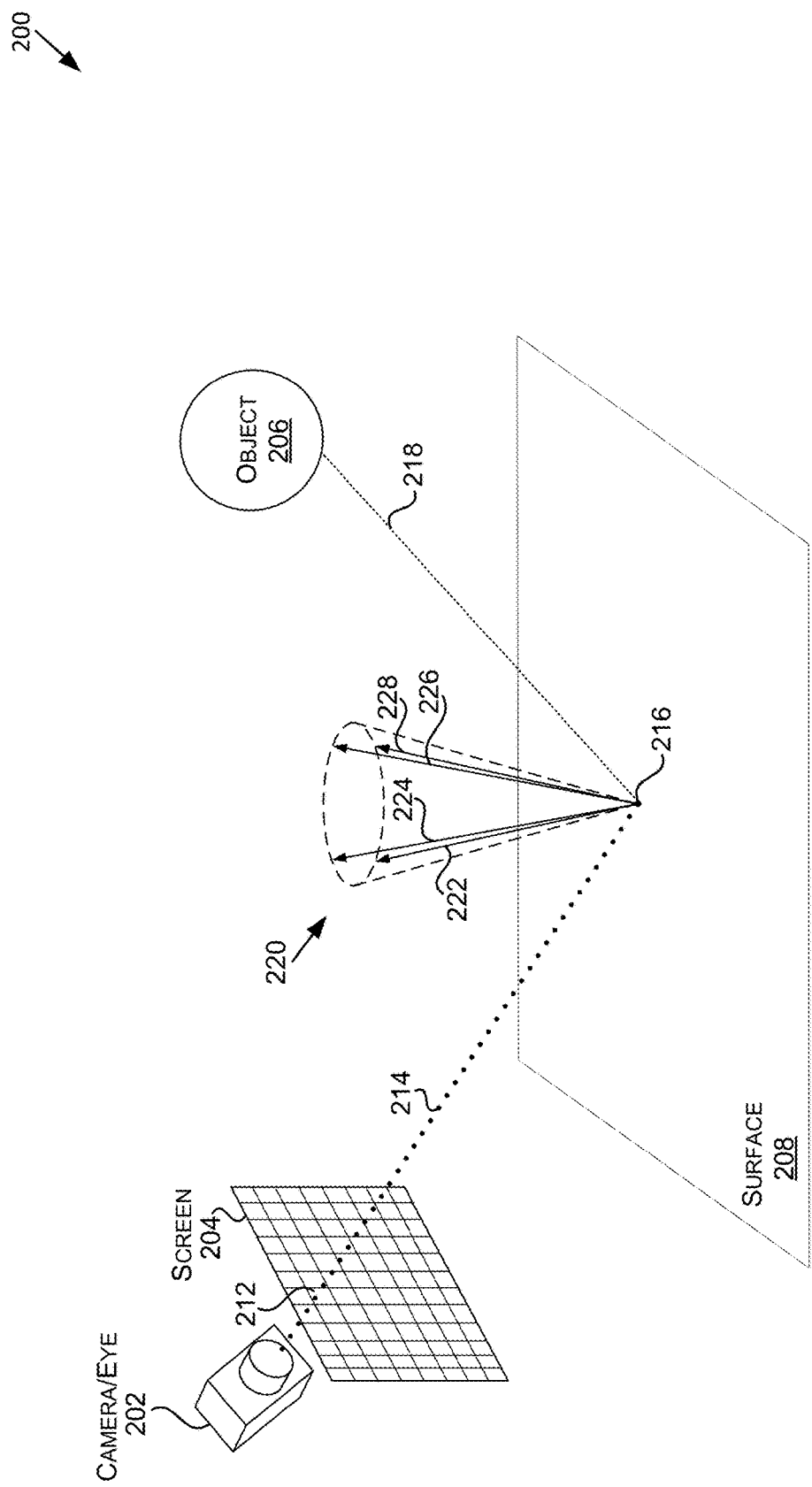
FIG. 2A is a diagram illustrating an example of geometry of a normal distribution function (NDF) range of an NDF, which may be used to determine a filter for denoising reflections, in accordance with some embodiments of the present disclosure.
Figure 2B:
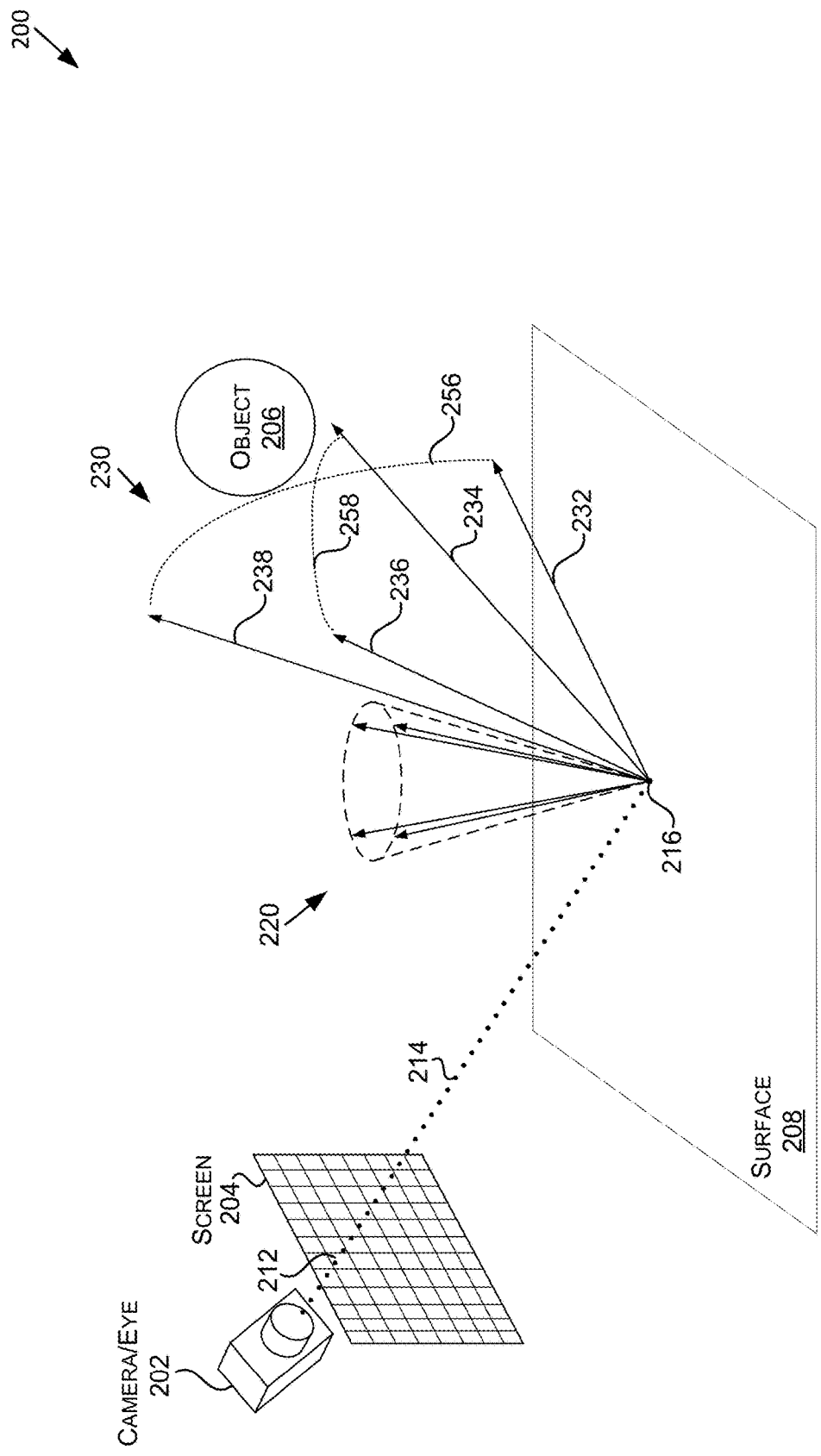
FIG. 2B is a diagram illustrating an example of geometry of a BRDF lobe of a BRDF, which may be used to determine a filter for denoising reflections, in accordance with some embodiments of the present disclosure.

The image renderer 102 may render the image 114 (and/or portions or components thereof) using any suitable approach for ray-tracing reflections, such as stochastic ray-tracing. Examples of stochastic ray-tracing techniques that may be used by the image renderer 102 include those that employ Monte Carlo or quasi-Monte Carlo sampling strategies. FIGS. 2A and 2B are used to further describe examples of suitable ray-tracing approaches that may be employed by the image renderer 102. Referring now to FIGS. 2A and 2B with FIG. 1, FIG. 2A is a diagram illustrating an example of geometry of a normal distribution function (NDF) range 220 of an NDF, which may be used to determine the filter 120 for denoising reflections, in accordance with some embodiments of the present disclosure. FIG. 2B is a diagram illustrating an example of geometry of a BRDF lobe 230 of a BRDF, which may be used to determine the filter 120 for denoising reflections, in accordance with some embodiments of the present disclosure.

FIG. 2A shows the virtual environment 200 including a camera 202, a screen 204, an object 206, and a surface 208. The screen 204 may be a virtual representation of a screen which may or more not be the same resolution as the image 114 and/or the image 116. The screen 204 may include a matrix of virtual pixels or regions, of which a pixel 212 is individually labeled. To determine at least some lighting condition data for the pixel 212 (e.g., corresponding to the pixel 132 of FIG. 1), the image renderer 102 may cast any number of rays (e.g., one or more)—such as a ray 214—through the pixel 212 of the screen 204 to sample lighting conditions for the pixel 212. These rays may be referred to as camera rays, eye rays, incident rays, view vectors, or primary rays, as examples. The image renderer 102 may use the camera rays to determine visible points in the environment which may be affected by the object 206 and/or at least one light source. For example, the image renderer 102 may use the ray 214 to determine a point 216 on or near the surface 208. This may include the image renderer 102 determining the point 216 as the location where the ray 214 intersects with the surface 208 (or the point 216 may otherwise be based at least in part on that location). Although the ray 214 intersects with the surface 208, in examples where more than one ray is cast, not all rays may intersect with a surface.

From each point in the virtual environment 200 that the image renderer 102 determines using a ray cast through the pixel 212, any number of rays (e.g., one or more)—such as a ray 218—may be cast to model a reflection of the ray 214 at the point 216. The image renderer 102 may determine the direction of the ray 218 based at least in part on a normal of the surface 208 at the point 216. For example, the image renderer 102 may define the NDF range 220 for the point 216 based at least in part on the normal of the surface 208 at the point 216. The image renderer 102 may use the NDF, the ray 214, and a roughness value of the surface 208 that is associated with the point 216 to define the BRDF (e.g., using a glossy microfacet BRDF model). For example, the NDF range 220 may be defined using a function (the NDF) that defines a likelihood of a microfacet being aligned in a particular direction. The BRDF lobe 230 may be defined using a function (the BRDF) that uses the NDF as a weighting function to scale the brightness of reflections. The image renderer 102 may sample the BRDF lobe 230 (e.g., stochastically using the BRDF or using another sampling strategy) to determine the ray 218. These rays may be referred to as reflected rays, or secondary rays, as examples. Although the ray 218 intersects with the object 206, in examples where more than one ray is cast, not all rays may intersect with the object 206. For example, a ray may intersect with a different object or may not intersect with any object.

The various rays (e.g., the ray 214 and the ray 218) may be used by the image renderer 102 to determine ray-traced samples of lighting conditions for the pixel 212. For example, the rays may form any number of virtual light paths between the pixel 212 and one or more light sources, any number of examples of which may include the ray 214 and the ray 218. The object 206 may be an example of such a light source, or the object 206 may be another type of object, such as a non-light emitting reflective object. Where the object 206 is not a light source, the virtual light path may further include one or more rays to a light source. The image renderer 102 may determine at least some lighting condition data for the pixel 212 by combining (e.g., averaging) the lighting condition data derived from the various ray-traced samples. The image renderer 102 may similarly determine at least some lighting condition data for each pixel or region of the screen 204 (e.g., using any number of shadow rays and camera rays).

While a glossy microfacet BRDF model is described for determining lighting condition data for a pixel, other reflective models may be used to determine lighting condition data for pixels in addition to or instead of the glossy microfacet BRDF model. For example, a specular reflection model may be employed in which the surface 208 is treated as a mirror. This may correspond to a roughness value of zero at the point 216, and the ray 218 may comprise a mirrored reflection of the ray 214. In such examples, an NDF and BRDF may not be used to determine the lighting condition data (e.g., incoming radiance), which may reduce processing requirements, such as by avoiding stochastic sampling, which may include computationally expensive importance sampling. Further examples of determining lighting condition data for a pixel are further described with respect to FIG. 4.

The image renderer 102 may use the lighting condition data for each pixel to render one or more corresponding pixels of the image 116. Generally, the accuracy of the lighting conditions that the image renderer 102 computes for a pixel with respect to a light source may increase with the number of camera and/or reflected rays used to sample the lighting conditions. However, the computing resources used to determine the lighting conditions also may increase with the number of rays, which may increase render times.

To preserve computing resources and to reduce render times, the number of rays used to sample lighting conditions may be below what is needed for reflection quality to converge to an ideal ray-traced result. This may result in the image renderer 102 generating lighting condition data that includes noisy reflection image data, as indicated in the image 114. The image 114 is an example in which the lighting conditions of each pixel of the screen 204 with respect to the object 206 is based on a single ray-traced sample of a state of the virtual environment 200 (e.g., comprising a single camera or eye ray and a single reflected ray per incident ray). As indicated, the noise represented by reflection image data may indicate one or more properties of the surface on which it is manifested. For example, a region 150 of the image 114 may be more reflective than a region 152 of the image due to the region 152 being associated with a higher surface roughness value, resulting in more diffuse lighting conditions.

To reduce noise in the lighting condition data for the pixels, the image renderer 102 may filter the lighting condition data to render the image 116. In FIG. 1, the filter 120 is indicated in image or screen space relative to the image 114 to show an example of a filter that the image renderer 102 may use to filter the lighting condition data. In some examples, the filter determiner 106 may determine a filter for each pixel of the screen 204, the image 114, and/or the image 116. The image renderer 102 may apply the filters to the lighting condition data at image (e.g., pixel) locations corresponding to the associated pixels to render the image 116. In various examples, one or more of the filters may be applied in parallel. Further, each filter (e.g., the filter 120) may be applied as a separable filter (e.g., a separable cross bilateral filter) that comprises multiple sub-filters that may be applied in multiple passes. Additionally, while examples of information used to determine properties of the filter 120 are provided, additional information may be used that results in corresponding adjustments to the properties (e.g., dimensions) of the filter 120. Further in some examples, the filter 120 may be incorporated into one or more other filters.

Using approaches described herein, the image renderer 102 may apply the filters such that the image 116 accurately reflects the lighting conditions for the virtual environment 200. Due to the quality of the filters, the image 116 may accurately reflect the lighting conditions for the virtual environment 200 even where the number of rays used to sample the lighting conditions is low. For example, only one camera ray and one reflected ray per incident ray may be used per-pixel while achieving accurate reflections.

The filter 120—and other filters described herein—may comprise a filter kernel and one or more filter directions. The filter kernel of a filter may refer to a matrix (e.g., rectangular array) that defines one or more convolutions for processing image data of an image to alter one or more characteristics of the image, such as shades and colors of the pixels of the image. In some examples, a filter kernel may be applied as a separable filter in which the matrix may be represented using multiple sub-matrices, or filters, that may be applied to an image in multiple passes. When determining or computing a filter kernel for a separable filter, the disclosure contemplates that the sub-matrices may be directly computed, or may be derived from another matrix.

Each element of a matrix of a filter kernel may represent a respective pixel position. One of the pixel positions of a matrix may represent an initial pixel position that corresponds to a pixel to which the filter is applied and is typically located at the center of the matrix. For example, when applying the filter 120 to the pixel 132 of the image 114, the pixel 132 may be used as the initial pixel position. A filter direction may define the alignment of the matrix relative to the image and/or pixel to which the filter is applied. Thus, when applying a filter to a pixel, other pixels for other pixel positions of a matrix of a filter kernel may be determined relative to the initial pixel position using the filter direction. For example, the filter 120 may be a separable filter that comprises two sub-matrices with one matrix having the filter direction 136 and the other matrix having the filter direction 138.

Each element of a matrix of a filter kernel may comprise a filter weight for the pixel position. The matrix may be applied to an image using convolution, in which a data value for each pixel of the image that corresponds to a pixel position of the matrix may be added to data values for pixels that correspond to the local neighbors in the matrix, weighted by the filter values (also referred to as filter weights). As described herein, the fitter values may be configured to blur the pixels, such as by fitting a distribution(s) to a size of the filter kernel (e.g., to a width and a height).

The data values to which a filter is applied may correspond to lighting condition data of the pixels. Thus, applying a matrix of a filter kernel to a pixel may cause the lighting condition data to be at least partially shared amongst the pixels that correspond to the pixel positions of the filter kernel. The sharing of the lighting condition data may mitigate noise due to sparsely sampling lighting conditions in ray-tracing when the filter kernel accurately defines which pixels may share lighting condition data (e.g., via the size of the matrix and filter direction(s)) and how much lighting condition data may be shared (e.g., via the filter weights). As such, where the size, filter direction(s), and/or filter weights of the filter kernel do not accurately reflect lighting conditions of a virtual environment, the filter kernel may cause over-blurring and/or unrealistic blurring, resulting in unrealistic lighting conditions being represented in a rendered image.

Conventional approaches for denoising ray-traced reflections compute an isotropic filter kernel which is always circularly symmetric, and often does not correspond to the footprint of a BRDF lobe in a virtual environment. Using the isotropic filter kernel for a filter may result in unrealistic blurring where either too few or too many pixels are blurred by the filter, and where the filter values of the filter do not result in lighting condition data being shared amongst pixels in a realistic manner. In various examples, the present disclosure may provide approaches for computing an anisotropic filter kernel that may be elongated so that a size of the filter kernel extends farther along a first axis than along a second axis to more closely reflect the footprint of a BRDF lobe in a virtual environment.

Further, conventional approaches for den sing ray-traced reflections treat all surfaces as diffuse surfaces to compute an isotropic filter kernel without accounting for the directional nature of a surface. However, this may be a prominent feature of some surfaces, such as glossy surfaces. Thus, the size, shape, orientation, and weights of the filter kernel may not accurately reflect the spatial characteristics of the virtual environment nor the reflective properties of the surface, which may cause over-blurring of the image in addition to an unrealistic blur pattern. Disclosed approaches may leverage the actual spatial and reflective properties of a virtual environment—such as the size, shape, and orientation of a BRDF lobe of a light path and its position relative to a reflection surface, a virtual screen, and a virtual camera—to produce, for a pixel, an anisotropic kernel filter having dimensions and weights that accurately reflect the spatial characteristics of the virtual environment as well as the reflective properties of the surface. Thus, disclosed approaches may be used to compute an anisotropic filter kernel or an isotropic filter kernel that has one or more dimensions that accurately reflects the spatial characteristics of the virtual environment and the reflective properties of the surface.

FIGS. 2A-2F are used to illustrate examples of the filter determiner 106 determining the filter 120 based on the pixel 212 of the screen 204. A similar approach may be used for each pixel of the screen 204 of the virtual environment 200. The filter determiner 106 may compute geometry of the virtual environment 200 to determine one or more dimensions and/or filter weights of the filter 120, such that the filter 120 accurately captures the reflective contribution of the point 216 to the lighting conditions of the pixel 212.

Figure 2C:
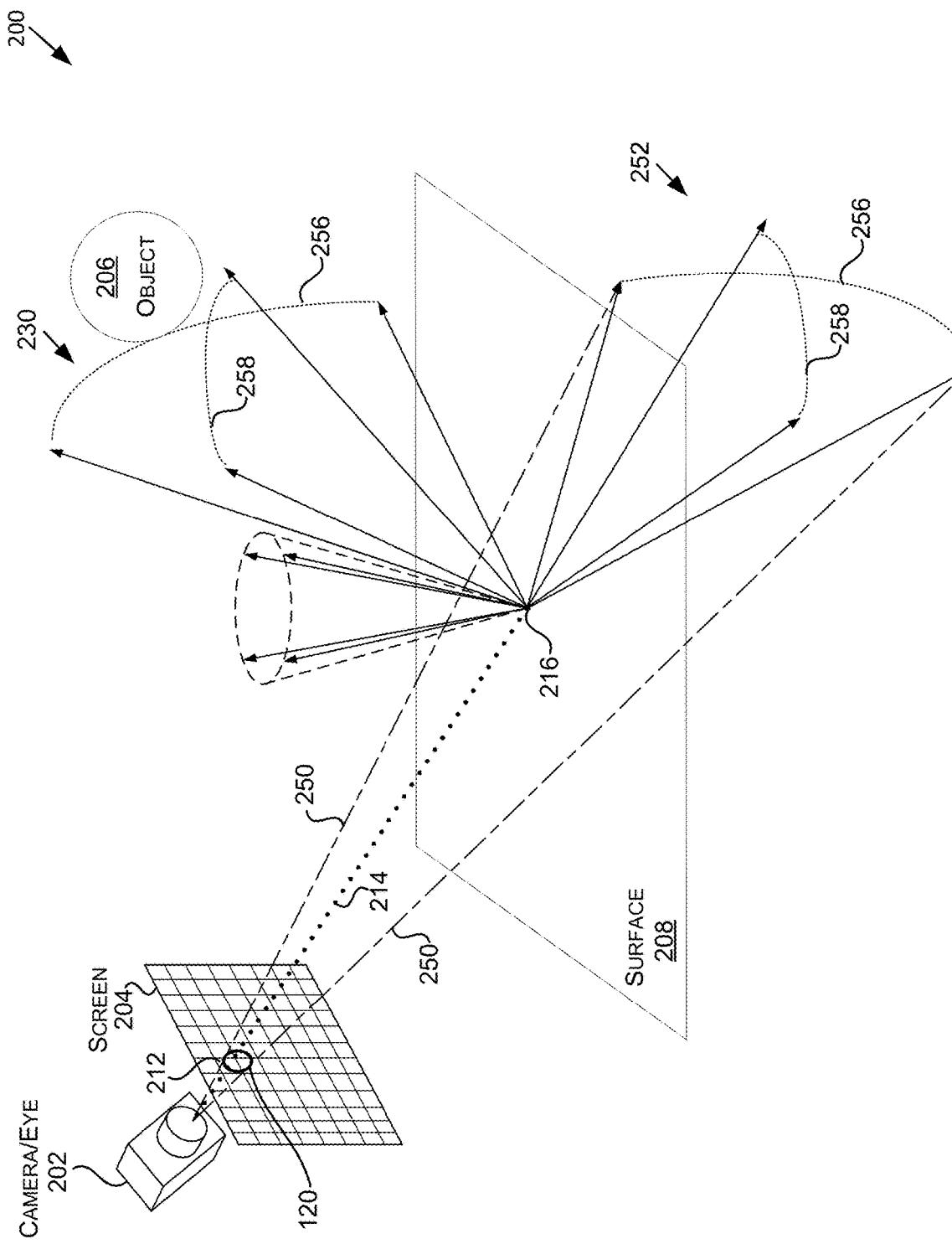
FIG. 2C is a diagram illustrating an example of geometry of a projection of a reflection of a BRDF lobe across a surface, which may be used to determine a filter for denoising reflections, in accordance with some embodiments of the present disclosure.

To determine a dimension(s) of the filter 120, the filter determiner 106 may compute one or more corresponding dimensions of the BRDF lobe 230 (shown in FIGS. 2B and 2C) in a world space of the virtual environment 200 using geometry of the virtual environment 200. The dimension(s) of the BRDF lobe 230 may be used to determine the dimension(s) of the filter 120 in image space, as indicated in FIG. 2C. By computing the dimension(s) of the filter 120 using the dimension(s) of the BRDF lobe 230, the dimension(s) may accurately reflect a region around the pixel 212 in which the reflective properties at the point 216 may contribute to lighting conditions of the pixel 212. For example, the filter 120 may be sized, shaped, and orientated to correspond to a potential distribution of reflected rays (e.g., the ray 218) from the ray 514 at the point 216 that may contribute to lighting conditions at the pixel 212 with respect to the object 206 and the camera 202.

Further, in various examples, the filter 120 may be an anisotropic filter that is elongated in a direction from the point 216 towards the object 206. This may result in the filter 120 being an anisotropic filter such that the shape of the filter 120 may accurately reflect a shape of the region around the pixel 212 in which the potential distribution of reflected rays (e.g., the ray 218) from the ray 214 at the point 216 that may contribute to lighting conditions at the pixel 212 with respect to the object 206 and the camera 202.

Figure 2D:
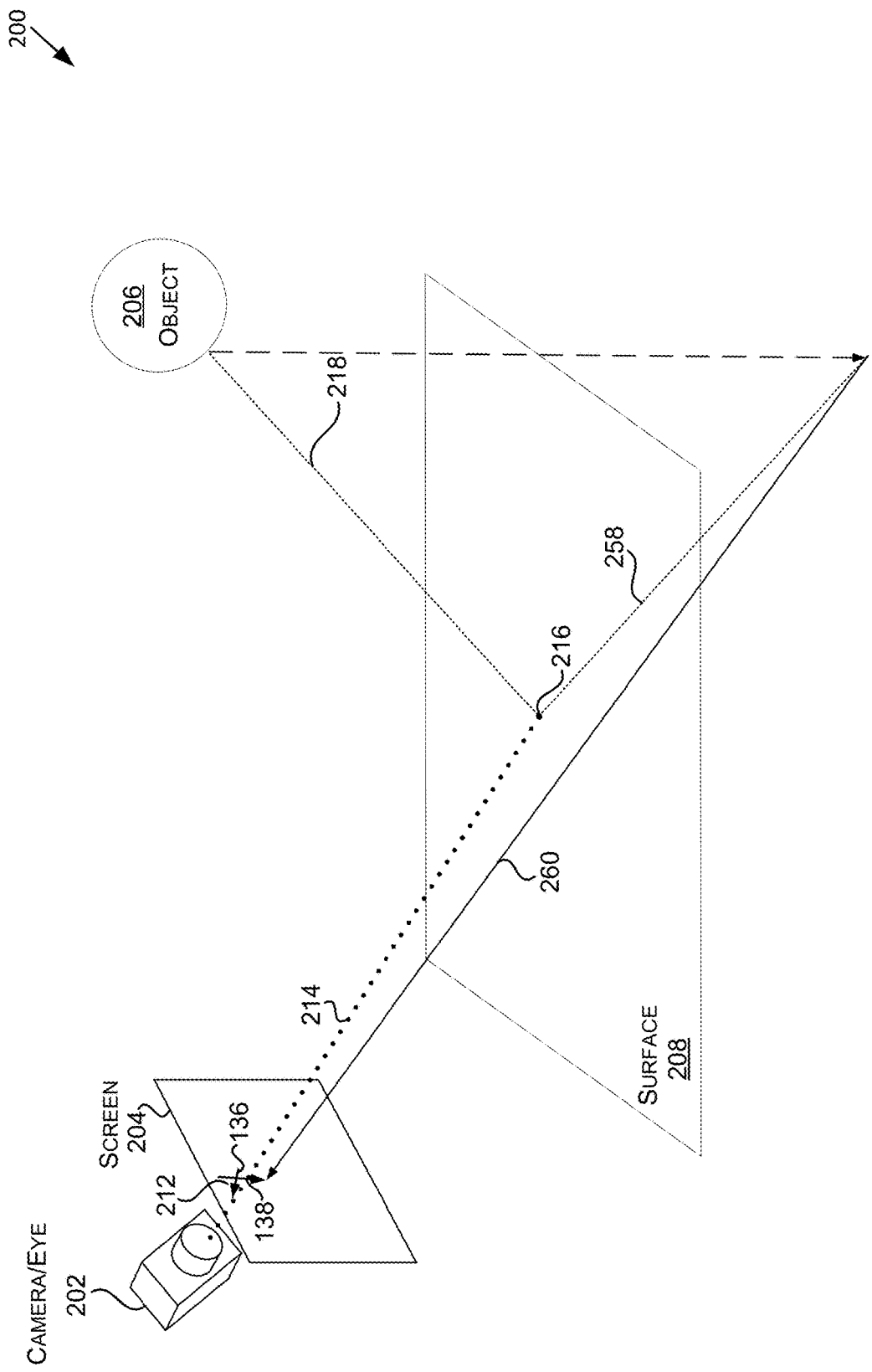
FIG. 2D is a diagram illustrating an example of locations of a projection of a reflected ray and a reflection of the reflected ray across a surface, which may be used to determine a filter direction for a filter for denoising reflections, in accordance with some embodiments of the present disclosure.
Figure 2E:
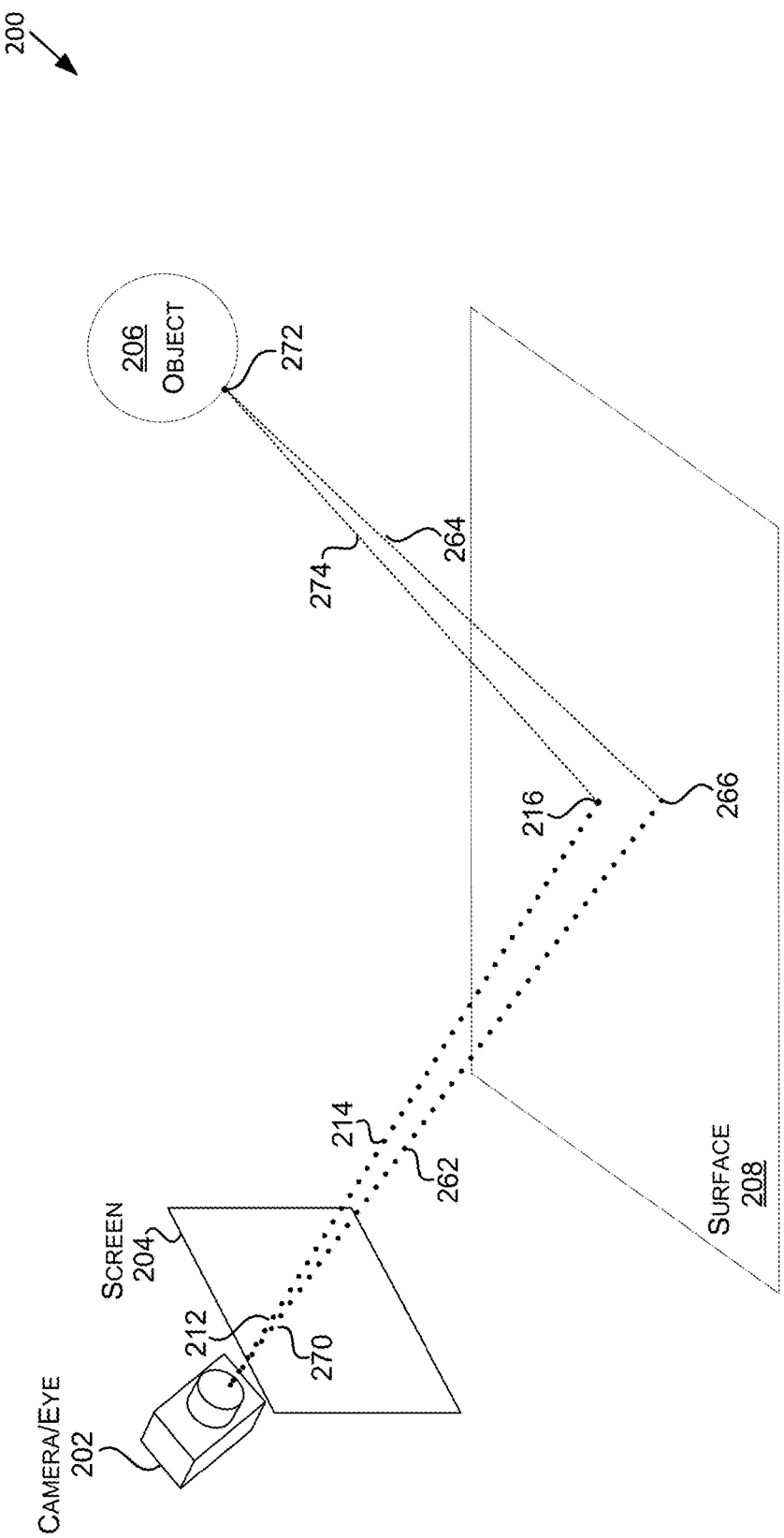
FIG. 2E is a diagram illustrating an example of a view vector and reflected ray with a neighbor view vector and reflected ray, in accordance with some embodiments of the present disclosure.

Additionally, the filter determiner 106 may compute one or more of filter directions 136 and 138 for the filter 120 in the image space using geometry of the virtual environment 200, as indicated in FIGS. 1 and 2E. The filter directions 136 and 138 may correspond to a direction of the point 216 to the object 206. By computing one or more of the filter directions of the filter 120 using geometry of the virtual environment 200, the filter directions may accurately reflect the directional nature of light from the point 216 across the region around the pixel 212.

To determine properties (e.g., dimensions) of the filter 120 (e.g., size, orientation, shape, etc.), the geometry determiner 104 may determine (e.g., compute) at least one geometry that corresponds to the BRDF lobe 230 that is associated with the point 216 in the virtual environment 200. In some examples, the point 216 is determined using the ray 214 as part of sampling the lighting conditions for the pixel 212. In these examples, the point 216 may be associated with one or more reflected rays, such as the ray 218. In other examples, the ray 214 may not have been used to determine lighting conditions for the pixel 212. In any example, rays, such as the ray 214 and the ray 218 may be used to test the visibility a point (e.g., the point 216) with respect to the camera 202 and/or the object 206, and a filter (e.g., the filter 120) may only be determined for points that are determined to be visible.

Geometry that corresponds to the BRDF lobe 230 may be computed based at least in part on geometry of the NDF range 220. For example, the geometry determiner 104 may determine (e.g., compute) at least one geometry of the BRDF lobe 230 based at least in part on the ray 214 and the NDF associated with the NDF range 220 (e.g., the NDF may be based at least in part on a roughness value of the surface 208 at the point 216). In doing so, the geometry determiner 104 may compute the at least one geometry of the BRDF lobe 230 such that the at least one geometry corresponds to at least one geometry that defines the NDF range 220.

Although the present disclosure refers to a roughness value of a surface at a point, surface roughness may be defined using any suitable approaches, which may include using one or more roughness values. For example, where the NDF captures a GGX distribution, a single roughness value may be used. However, the examples provided herein may be adapted to other microfacet distribution models as needed. In various examples, the present disclosure may be used with GGX, Beckman, Blinn-Phong, or other types of NDF distributions, which may also include non-standard distributions. Where multiple roughness values are defined, a single roughness value may be determined and used as described herein (e.g., for evaluation against a threshold(s)) by combining the roughness values, one of the roughness values may be used, or the approaches may otherwise be suitably adapted.

FIG. 2A shows vectors 222, 224, 226, and 228 (e.g., half-vectors) which are examples of the at least one geometry of the NDF range 220 that may define the at least one geometry of the BRDF lobe 230. The vectors 222, 224, 226, and 228 define extreme bounds of the NDF range 220. The geometry determiner 104 may compute vectors 232, 234, 236, and 238 of FIG. 2B (e.g., half-vectors) of the BRDF lobe 230, such that they correspond to the vectors 222, 224, 226, and 228 of the NDF range 220. For example, each of the vectors 232, 234, 236, and 238 of the BRDF lobe 230 may correspond to a respective one of the vectors 222, 224, 226, and 228 of the NDF range 220. The vectors 232, 234, 236, and 238 of the BRDF lobe 230 may be computed, in a non-limiting example, in left, right, forward, and backward directions from the perspective view of the vector. Although the geometry determiner 104 may use four geometries that correspond to the extreme bounds of the NDF range 220, and four corresponding geometries of the BRDF lobe 230, any number of geometries (e.g., vectors) may be used in various examples. In some examples, at least two vectors The geometry determiner 104 may further, based at least in part on the at least one geometry of the BRDF lobe 230, compute at least one dimension of the filter 120 (e.g., one or more filter directions, and/or geometries of the filter 120, such as to define a size, orientation, and/or shape thereof). To do so, the geometry determiner 104 may use the at least one geometry of the BRDF lobe 230 (e.g., the vectors 232, 234, 236, 238) to compute at least one geometry of a cross-section, at the screen 204, of a projection 250 of a reflection 252 of the BRDF lobe 230 below the surface 208 along a view vector (e.g., the ray 214) to the pixel 212. The geometry determiner 104 may use the at least one geometry of the cross-section as at least one geometry of the filter 120 or may otherwise determine at least one geometry of the filter 120 using the at least one geometry of the cross-section.

In various examples, the geometry determiner 104 may determine (e.g., compute) angles 256 and 258 between pairs of the vectors 232, 234, 236, 238 (e.g., one angle between left and right vectors and another angle between forward and backward vectors). The geometry determiner 104 may use the angles 256 and 258 to derive geometry of the cross-section of the projection 250, which may represent a footprint of the BRDF lobe 230 in image or screen space. For example, the angles 256 and 258 may be used to compute a geometry(ies) of the cross-section, as well as a hit distance that defines how far the angles 256 and 258 should extend out in the virtual environment 200 (the hit distance may correspond to the ray 218 in some examples). In doing so, the cross-section may be computed such that it corresponds to the projection 250 of the reflection 252 of the BRDF lobe 230 across (e.g., below) the surface 208, such as below the shading horizon.

The dimension(s) of the cross-section of the projection 250 may be used as the dimension(s) of the filter 120 and/or may be used to derive one or more dimensions of the filter 120. Thus, the geometry determiner 104 may use geometry that corresponds to the BRDF lobe 130 to define a size, orientation, and/or a shape of the filter 120. For example, one geometry (e.g., a radius, or a width 310 labeled in FIG. 3A) of the filter 120 may correspond to the angle 256. Additionally or alternatively, another geometry (e.g., a radius, or a width 320 labeled in FIG. 3B) of the filter 120 may correspond to the angle 258.

In various examples, the filter determiner 106 may use the geometry determiner 104 to determine one or more filter directions of the filter 120 based at least in part on the ray 218, which may or may not have been used by the image renderer 102 to sample lighting conditions for the pixel 212 (e.g., to determine image data corresponding to the image 114). Referring now to FIG. 2D, FIG. 2D is a diagram illustrating an example of determining a filter direction 136, which may be used to determine the filter 120 for denoising reflections, in accordance with some embodiments of the present disclosure. For example, the geometry determiner 104 may determine (e.g., compute) the filter direction 136 based at least in part on a projection 260 of a reflection 258 of the ray 218 below the surface 208 along a view vector (e.g., the ray 214) to the pixel 212. The geometry determiner 104 may in some examples compute the filter direction 138 based at least in part on the filter direction 136, such as by rotating the filter direction 138 about a rotation angle (e.g., 90 degrees such that the filter direction 136 is perpendicular to the filter direction 138).

Referring now to FIG. 2E, FIG. 2E is a diagram illustrating an example of a view vector and reflected ray with a neighbor view vector 262 and reflected ray 264 associated with a point 266 on the surface 208 and a neighbor pixel 270 to the pixel 212, in accordance with some embodiments of the present disclosure. In some examples, the NDF uses the ray 214 and a ray 274 from the point 216 to a neighbor reflection ray hit point 272 as an input during filtering (e.g., cross bilateral filtering). For example, an NDF weight may be computed (e.g., during or prior to filter time) for the ray-traced sample(s) for the neighbor pixel 270, which may be used by the image filterer 108 to weight the lighting condition data for the neighbor pixel 270 when applying the filter 120 to the pixel 212 (and/or the pixel 132). The NDF weight may be used as a filter weight for the pixel 270, or may be used to derive a filter weight for the pixel 270. The NDF weight may account for the mismatch in the BRDF between the point 216 and the point 266. An NDF weight may be computed for the pixel 270 when applying the filter 120 to the pixel 212, for example, based at least in part by computing the NDF value using the ray 214 and the ray 274. The ray 274 may be to the neighbor reflection ray hit point 272 that was used for a sample of the lighting condition data for the pixel 270 (e.g., using the ray 262 and the ray 264). The NDF weight may correspond to the NDF value. For example, the NDF value may be normalized (e.g., to a range between 0 and 1) and used as the NDF weight. Where multiple samples where used for the pixel 270, multiple NDF values may be similarly computed and combined (e.g., averaged) to form the NDF weight, or a single NDF value may be used. The NDF weight(s) may similarly be computed and used for each pixel position in the filter 120 and corresponding sample(s) (other than the initial pixel position).

In various examples, the geometry determiner 104 may determine the size of the filter 120 and/or one or more geometries thereof based at least in part on an amount of rays (e.g., ray-traced samples) used to determine lighting conditions of the for the pixel 132 and/or the pixel 212. For example, the present disclosure may provide for accurate reflections using a single ray-traced sample of a state of the virtual environment 200 that includes the ray 214 and the ray 218. Where more than one ray-traced sample is used, the geometry determiner 104 may compute the size and/or one or more geometries of the filter 120, such that the size and/or one or more geometries decrease based on (e.g., proportionally with) the number of samples (and/or reflected rays and/or eye rays). A suitable adjustment factor for the size and/or one or more geometries may be computed by the geometry determiner 104 as $1/\sqrt{n}$, where n is the number of ray-traced samples.

In some examples, the image renderer 102 uses at least one ray-traced sample of at least one previous state of the virtual environment 200 (e.g., each state may correspond to a rendered frame representative of the virtual environment 200) to determine lighting conditions for the pixel 132 and/or the pixel 212 at a subsequent state of the virtual environment 200. For example, any number of temporal ray-traced samples may be used to determine lighting conditions for the pixel 132 and/or the pixel 212 in addition to the one or more spatial or current ray-traced samples used to determine the lighting conditions for the pixel 132 and/or the pixel 212 (e.g., using a temporal filter that may use the geometry of the filter 120). Where a number of temporal ray-traced samples are used, those samples may be counted toward the number of ray-traced samples n, or may otherwise be used to reduce the size and/or one or more geometries of the filter 120.

Using approaches described herein, at grazing angle the filter 120 may be stretched along with the glossy reflection itself, and in a region where the ray 214 is more perpendicular to the surface 208, the filter 120 may become less elongated because it may correspond to the BRDF lobe 230 at the point 216.

The filter determiner 106 may use the dimension(s) of the filter 120 to determine a filter kernel for the filter 120. For example, the filter determiner 106 may form the filter kernel of the filter 120 with a first pixel width that corresponds to the width 310 (of FIG. 3A) computed for the filter 120 (e.g., corresponding to the filter direction 136). Additionally or alternatively the filter determiner 106 may form the filter kernel of the filter 120 with a second pixel width that corresponds to the width 320 computed for the filter 120 (e.g., corresponding to the filter direction 138).

In addition to or alternatively from using the NDF values described with respect to FIG. 2E to determine the filter weights for the filter 120, filter weights for the filter 120 may be determined based at least in part on fitting a distribution function(s) to a width(s) of the filter 120, as described with respect to FIG. 3A and FIG. 3B.

Referring now to FIG. 3A, FIG. 3A is a diagram illustrating an example of a graph 300A of filter weight values that may be determined by fitting a distribution function to the width 310 of the filter 120 along the filter direction 136, which may be used to determine filter weights for the filter 120, in accordance with some embodiments of the present disclosure.

The filter determiner 106 may compute filter weights for the filter 120 based at least in part on fitting a distribution function to the width 310 of the filter 120 along the filter direction 136, as indicated in FIG. 3A. The width 310 may span a pixel position 314 and a pixel position 316, with the pixel position 312 therebetween. The pixel position 312 may, for example, correspond to a midpoint or center of the filter kernel, and may be an initial pixel position to which the filter 120 is applied. For example, where the image filterer 108 applies the filter 120 to the pixel 212, the pixel 212 may correspond to the initial pixel position.

By fitting the distribution function to the width 310, the filter determiner 106 may compute the filter values of the filter 120 such that the filter values across the pixel positions of the width 310 substantially correspond to the distribution function or are otherwise based at least in part on the distribution function. For example, the distribution function of FIG. 3A may be a Gaussian distribution function in which the filter determiner 106 sets or maps the mean or center of the Gaussian distribution function to the pixel position 312. Thus, the pixel position 312 may be associated with a highest filter value.

The filter determiner 106 may also set or map one or more other points along the distribution function to one or more other pixel positions. For example, the filter determiner 106 may set or map a first position from the mean or center of the distribution function that corresponds to one or more standard deviations (or other distance) from the mean or center to the pixel position 314. Similarly, the filter determiner 106 may set or map a second position from the mean or center of the distribution function that corresponds to one or more standard deviations (or other distance) from the mean or center to the pixel position 316. In the example shown, the pixel position 314 and the pixel position 316 may each be associated with a lowest filter value along the width 310 due to using a Gaussian distribution function. The positions of the pixel position 314 and the pixel position 316 with respect to the distribution function are shown as examples in FIG. 3A, and may vary. For example, the pixel position 314 and the pixel position 316 may be associated with different filter values with respect to one another.

Referring now to FIG. 3B, FIG. 3B is a diagram illustrating an example of a graph 300B of filter weight values that may be determined by fitting a distribution function to the width 320 of the filter 120 along the filter direction 138, which may be used to determine filter weights for the filter 120, in accordance with some embodiments of the present disclosure. The graph 300A may be depicted at the same scale as the graph 300B The filter determiner 106 may compute filter weights for the filter 120 based at least in part on fitting a distribution function to the width 320 of the filter 120 along the filter direction 138, as indicated in FIG. 3B. The width 320 may span a pixel position 324 and a pixel position 326, with the pixel position 312 therebetween.

By fitting the distribution function to the width 320, the filter determiner 106 may compute the filter values of the filter 120 such that the filter values across the pixel positions of the width 320 substantially correspond to the distribution function or are otherwise based at least in part on the distribution function. For example, the distribution function of FIG. 3B may be a Gaussian distribution function, similar to FIG. 3A, in which the filter determiner 106 sets or maps the mean or center of the Gaussian distribution function to the pixel position 312. In other examples, different distribution functions may be fit to different filter directions for determining filter weights of the filter 120. The distribution function(s) may capture the relative contribution of lighting conditions of adjacent pixels to the pixel at the initial pixel position (e.g., the pixel 212), such that lighting information may be appropriately shared with the pixels. For example, the farther the pixel from the initial pixel position, the less likely it is to contribute to the lighting conditions of the pixel at the initial pixel position.

The filter determiner 106 may also set or map one or more other points along the distribution function to one or more other pixel positions. For example, the filter determiner 106 may set or map a first position from the mean or center of the distribution function that corresponds to one or more standard deviations (or other distance) from the mean or center to the pixel position 314. Similarly, the filter determiner 106 may set or map a second position from the mean or center of the distribution function that corresponds to one or more standard deviations (or other distance) from the mean or center to the pixel position 316. In the example shown, the pixel position 324 and the pixel position 326 may each be associated with a lowest filter value along the width 320 due to using a Gaussian distribution function. The positions of the pixel position 324 and the pixel position 326 with respect to the distribution function are shown as examples in FIG. 3B, and may vary. For example, the pixel position 324 and the pixel position 326 may be associated with different filter values with respect to one another. In the example of FIGS. 3A and 3B, the distribution of filter weight values along the width 320 may be more spread out than along the width 310 based at least in part on the width 320 being greater than the width 310 (e.g., because the Gaussian distribution function is mapped in a similar way to each width). Further, it is noted that while a distribution(s) may be used to determine the filter weights, one or more of the filter weights may not follow the distribution. For example, where the normal for a pixel at a pixel position is significantly different from the pixel at the initial pixel position (indicating they may face different directions), the filter weight value for that pixel position may be reduced and/or set to zero. The graphs 300A and 300B may correspond to cross-bilateral components of the filter 120.

In any example, to determine any of the various geometry described herein, the geometry determiner 104 may leverage image render data used by the image renderer 102 to render image data for the image 114 and/or the image 116. Examples include hit distance data, scene depth data, world normal, and light source sizes and directions. For example, the geometry determiner 104 may use hit distance data from a hit distance buffer to determine one or more distances used to compute geometry of the filter 120, any of which may be from a geometry buffer used to render the image 116. Examples include the distance between the point 216 and the screen 204 and/or between the point 216 and the object 206 (e.g., a ray hit distance). Further, the geometry determiner 104 may use scene depth data from a depth buffer to determine one or more distances used to compute geometry of the filter 120. An example includes one or more distances between the screen 204 and the reflection of the BRDF lobe 230.

In some examples, the image renderer 102 may determine lighting condition data for the point 216 using any of a variety of potential reflection models (e.g., a glossy microfacet model, a specular reflection model, etc.), and the filter 120 may be determined for the pixel 212 based at least in part on the BRDF lobe 230 and applied to the pixel 212 (and/or the pixel 132) (e.g., even where the BRDF lobe 230 is not used to determine the lighting condition data for the pixel 212).

The image renderer 102 may determine the reflection model used to determine the lighting condition data for the point 216 based at least in part on a roughness value associated with the point 216. For example, where the image renderer 102 determines the roughness value of the surface 208 for the point 216 is below a threshold value (e.g., within a range of roughness values), the image renderer 102 may use the specular reflection model to mirror the ray 218 from the ray 214 of the point 216 on the surface 208. The image renderer 102 may use a ray-traced sample corresponding to the ray 214 and the ray 218 to determine the lighting condition data for the point 216. As a non-limiting example, where the roughness value is on a linear scale ranging from 0 (e.g., perfectly smooth) to 1 (e.g. perfectly diffuse), the threshold value may be from 0.2 and 0.3.

Further, where the image renderer 102 determines the roughness value of the surface 208 is above the threshold value or a different threshold value (e.g., within a range of roughness values that is greater than zero), the image renderer 102 may use the glossy microfacet BRDF model to determine the ray 218 from the ray 214 of the point 216 on the surface 208. The image renderer 102 may use a ray-traced sample corresponding to the ray 214 and the ray 218 to determine lighting condition data for the pixel 212. As a non-limiting example, where the roughness value is on a linear scale ranging from 0 (e.g., perfectly smooth) to 1 (e.g. perfectly diffuse), the threshold value may be from 0.2-0.3. The range of roughness values defined by the threshold value may extend to 1.0.

Figure 4:
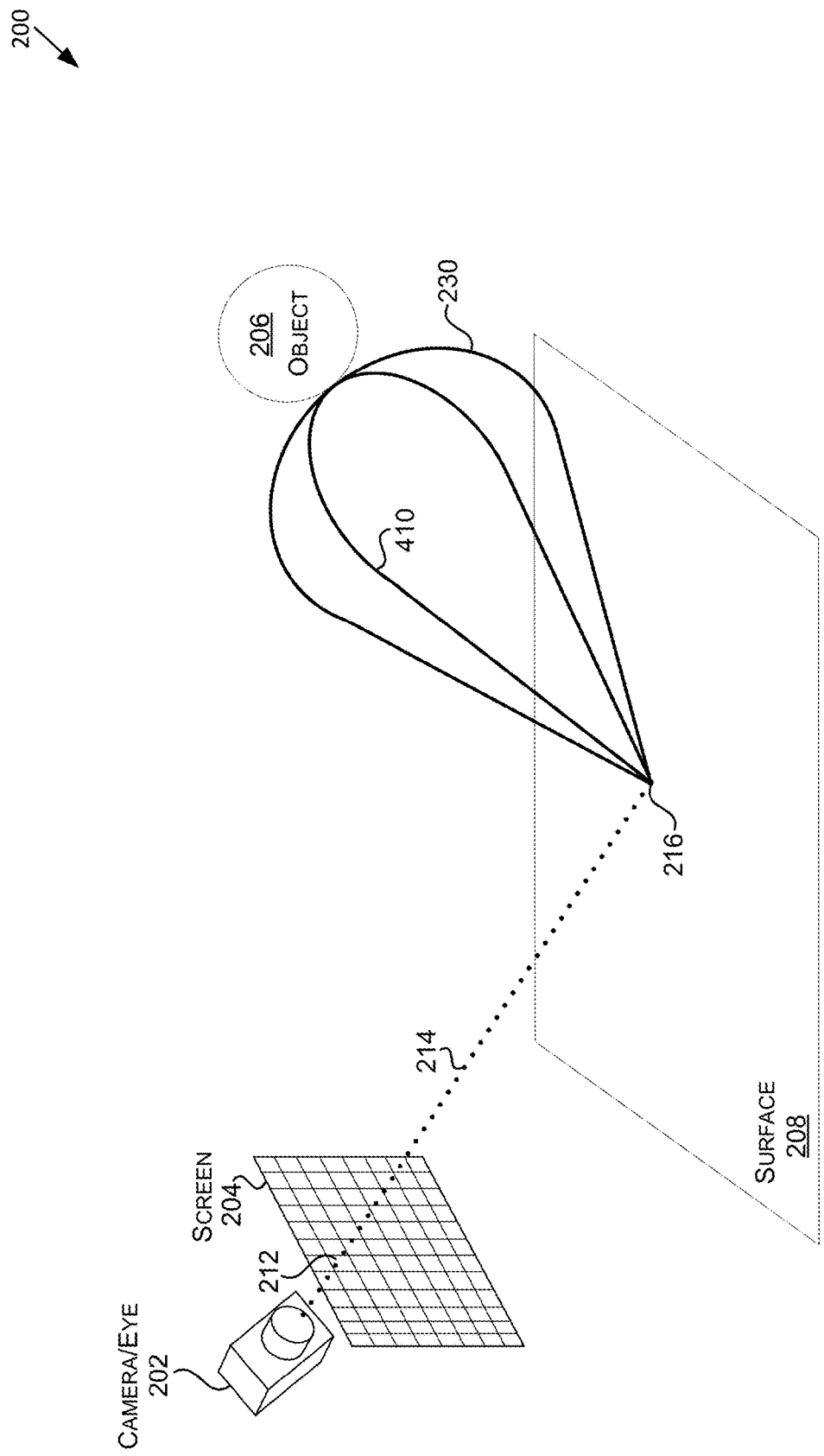
FIG. 4 is a diagram illustrating an example of a portion of a BRDF lobe, which may be sampled to determine lighting condition data, in accordance with some embodiments of the present disclosure.

Referring now to FIG. 4, FIG. 4 is a diagram illustrating an example of a portion 410 of the BRDF lobe 230, which may be sampled to determine lighting condition data, in accordance with some embodiments of the present disclosure. In various examples, where the image renderer 102 samples the BRDF lobe 230 to determine the lighting condition data for the point 216, the image render 102 may not sample the full BRDF lobe 230. For example, the image renderer 102 may sample the portion 410 of the BRDF lobe 230, which may reduce processing requirements, such as by reducing a probability space for importance sampling. The image renderer 102 may determine the portion 410 of the BRDF lobe 230, for example, by determining sampling bias data representative of a bias on sampling the BRDF lobe 230 based at least in part on the roughness value of the surface 208 at the point 216. For example, the bias on the portion 410 of the BRDF lobe 230 may be a function of the roughness value (e.g., a linear function). The image renderer 102 may determine the ray 218 within the portion of the BRDF lobe 230 from the ray 214 of the point 216 on the surface 208. Where the portion 410 of the BRDF lobe 230 is sampled, the geometry determiner 104 may compute the dimensions of the filter 120 (and/or the filter directions 136 and 138) using the portion 410 of the BRDF lobe 230, or may use the full BRDF lobe 230 shown in FIGS. 2A-2C.

In some examples, the image renderer 102 determines and samples the portion 410 of the BRDF lobe 230 (as opposed to the full BRDF lobe 230) based at least in part on determining the roughness value is greater than a threshold value (e.g., which may be greater than zero). For example, as a non-limiting example, where the roughness value is on a linear scale ranging from 0 (e.g., perfectly smooth) to 1 (e.g. perfectly diffuse), the threshold value may be between 0.2-0.3. The range of roughness values defined by the threshold value may additionally or alternatively extend to another threshold value, which may be between 0.7-1.0. For example, where the higher threshold value is less than one, above that threshold value, the image renderer 102 may be configured to sample the full BRDF lobe 230.

Thus, in some examples, from zero to a first threshold value of the roughness value the image renderer 102 may be configured to use a mirrored surface reflective model. From the first threshold value and higher the image renderer 102 may be configured to use a glossy microfacet reflective model. Further, from the first threshold value to a second threshold value the image renderer 102 may be configured to sample a portion (e.g., the portion 410) of the BRDF lobe 230. Above the second threshold value, the image renderer 102 may be configured to sample the full BRDF lobe 230.

Figure 5:
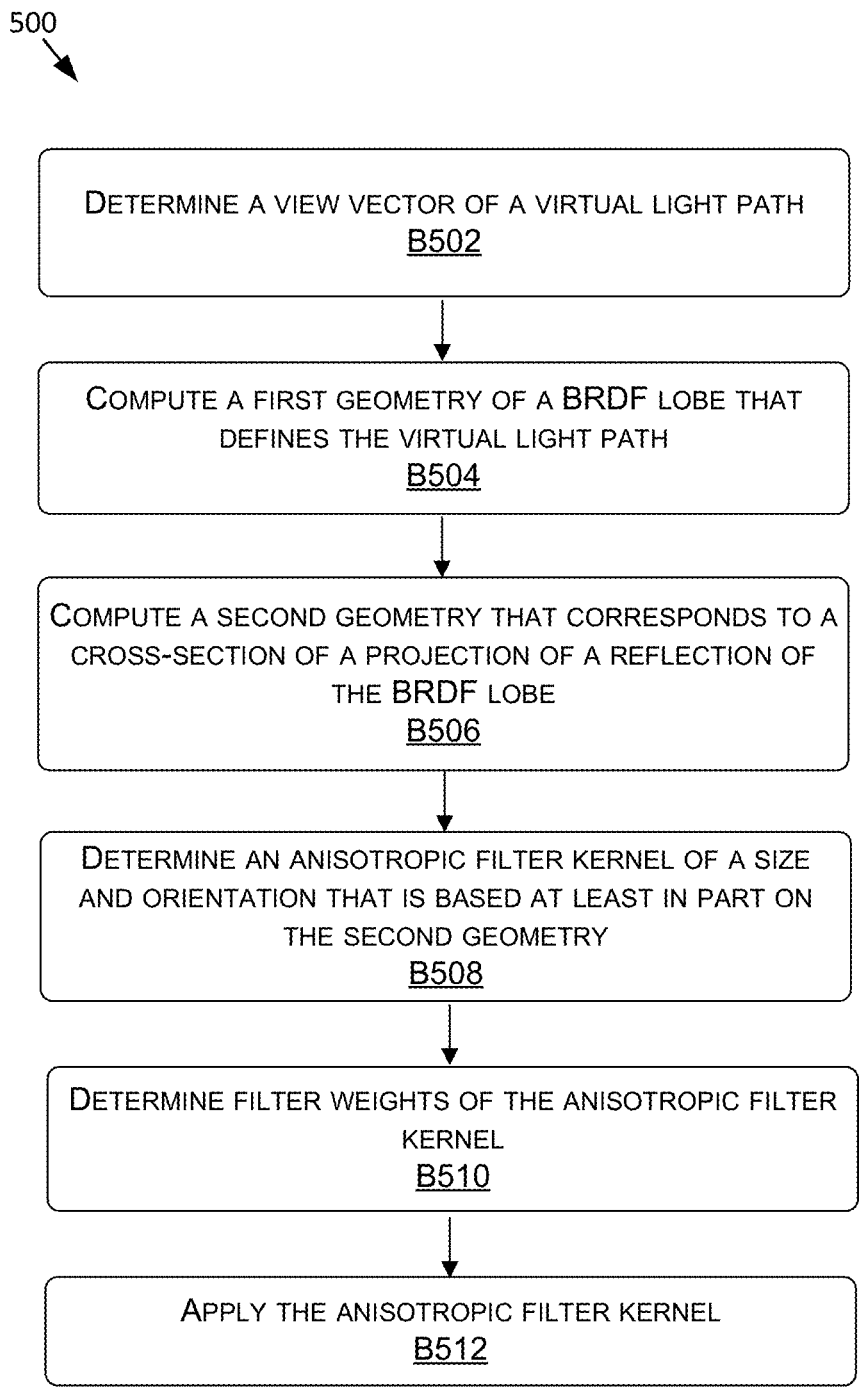
FIG. 5 is a flow diagram showing a method for determining a filter for denoising reflections, in accordance with some embodiments of the present disclosure.

Now referring to FIG. 5, each block of a method 500, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the reflection denoising system 100 (FIG. 1). However, these methods may additionally or alternatively be executed by any one system, or any combination of systems, including, but not limited to, those described herein.

FIG. 5 is a flow diagram showing the method 500 for determining a filter for denoising reflections, in accordance with some embodiments of the present disclosure. The method 500 may apply to the examples of any of FIGS. 2A-2E, or other examples. The method 500, at block B502, includes determining a view vector of a virtual light path. For example, the image renderer 102 may determine the ray 214 of a portion of a virtual light path that extends from the camera 202 of the virtual environment 200 to the point 216 on the surface 208 of the virtual environment 200. The virtual light path may project from the pixel 212 of the screen 204 in the virtual environment 200 to the point 216, and reflect from the point 216 on the surface 208 to intersect the object 206 (e.g., via the ray 218).

The method 500, at block B504, includes computing a first geometry of a BRDF lobe that defines the virtual light path. For example, the geometry determiner 104 may compute based at least in part on the ray 214 and the NDF associated with the NDF range 220 of the surface 208 at the point 216, geometry of the BRDF lobe 230, such as one or more of the angle 256 or the angle 258.

The method 500, at block B506 includes computing a second geometry that corresponds to a cross-section of a projection of a reflection of the BRDF lobe. For example, the geometry determiner 104 may, based at least in part on the geometry of the BRDF lobe (e.g., the angle 256 and/or the angle 258), compute geometry that corresponds to a cross-section, at the screen 204, of the projection 250 of the reflection 252 of the BRDF lobe 230 below the surface 208 along the ray 214 to the pixel 212. The angle 256 may define a first width of the cross-section and/or the angle 258 may define a second width of the cross-section.

The method 500, at block B508, includes determining an anisotropic filter kernel of a size and orientation that is based at least in part on the second geometry. For example, the first width of the cross-section may be used as the width 310 of the filter 120 and/or the second width of the cross-section may be used as the width 320 of the filter 120.

The method 500, at block B510, includes determining filter weights of the anisotropic filter kernel. For example, the filter determiner 106 may compute filter weights of the anisotropic filter kernel of the filter 120 along at least the filter direction 136 and/or the filter direction 138 based at least in part on the width 310 and/or the width 320.

The method 500, at block B512, includes applying the anisotropic filter kernel. For example, the image filterer 108 may apply the filter 120 to the pixel 132 in the image 114 that is representative of the screen 204, where the pixel 132 corresponds to the pixel 212.

Figure 6:
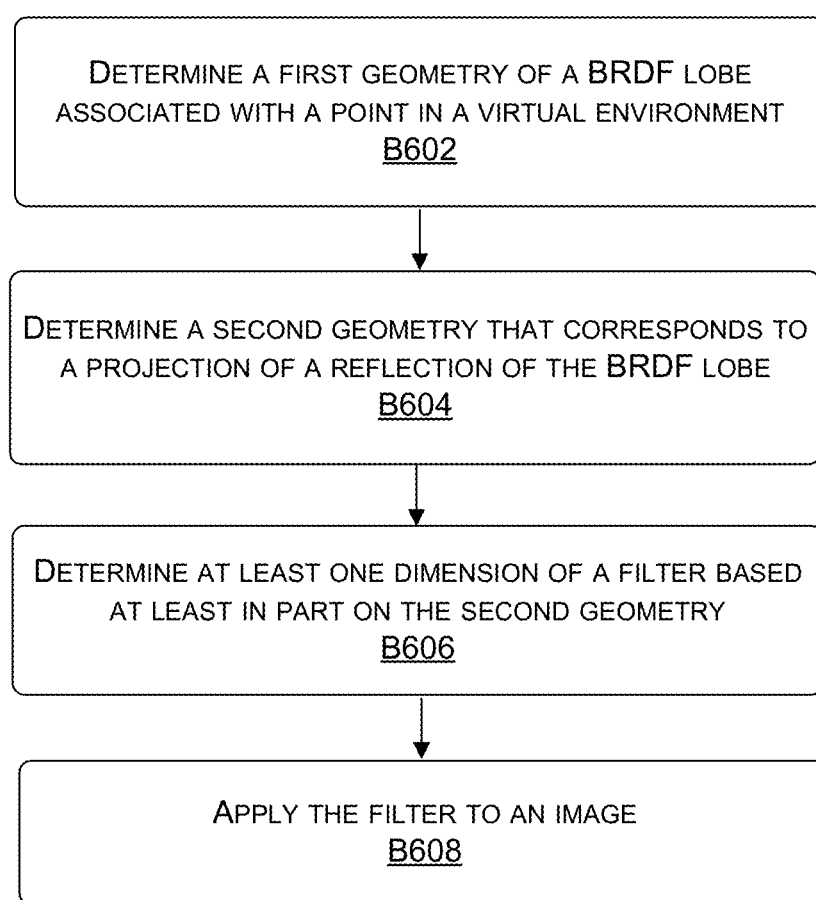
FIG. 6 is a flow diagram showing a method for determining a filter for denoising reflections, in accordance with some embodiments of the present disclosure.

FIG. 6 is a flow diagram showing a method 600 for determining a filter for denoising reflections, in accordance with some embodiments of the present disclosure. The method 600 may apply to the examples of any of FIGS. 2A-2E, or other examples. The method 600, at block B602, includes determining a first geometry of a BRDF lobe associated with a point in a virtual environment. For example, the geometry determiner 104 may determining, based at least in part on the ray 214 to the point 216 that corresponds to the surface 208 in the virtual environment 200 and the NDF that defined the NDF range 220 associated with the point 216, first geometry of the BRDF lobe of the point 216.

The method 600, at B604 includes determining a second geometry that corresponds to a projection of a reflection of the BRDF lobe. For example, the geometry determiner 104 may based at least in part on the first geometry of the BRDF lobe 230, determine a second geometry that corresponds to the projection 250 of the reflection 252 of the BRDF lobe 230 across the surface 208 along the ray 214 towards the screen 204.

The method 600, at B606 includes determining at least one dimension of a filter based at least in part on the second geometry. For example, the geometry determiner 104 and/or the image filterer 108 may determine one or more of the width 310, the width 320, the filter direction 136, the filter direction 138, or the filter weight values of the filter 120—based at least in part on the second geometry.

The method 600, at B608 includes applying the filter to an image. For example, the image filterer 108 may apply the filter 120 to the image 114 of the virtual environment 200 at a location (e.g., a location or pixel position in the image 114, such as the pixel 132) that corresponds to the ray 214.

Figure 7:
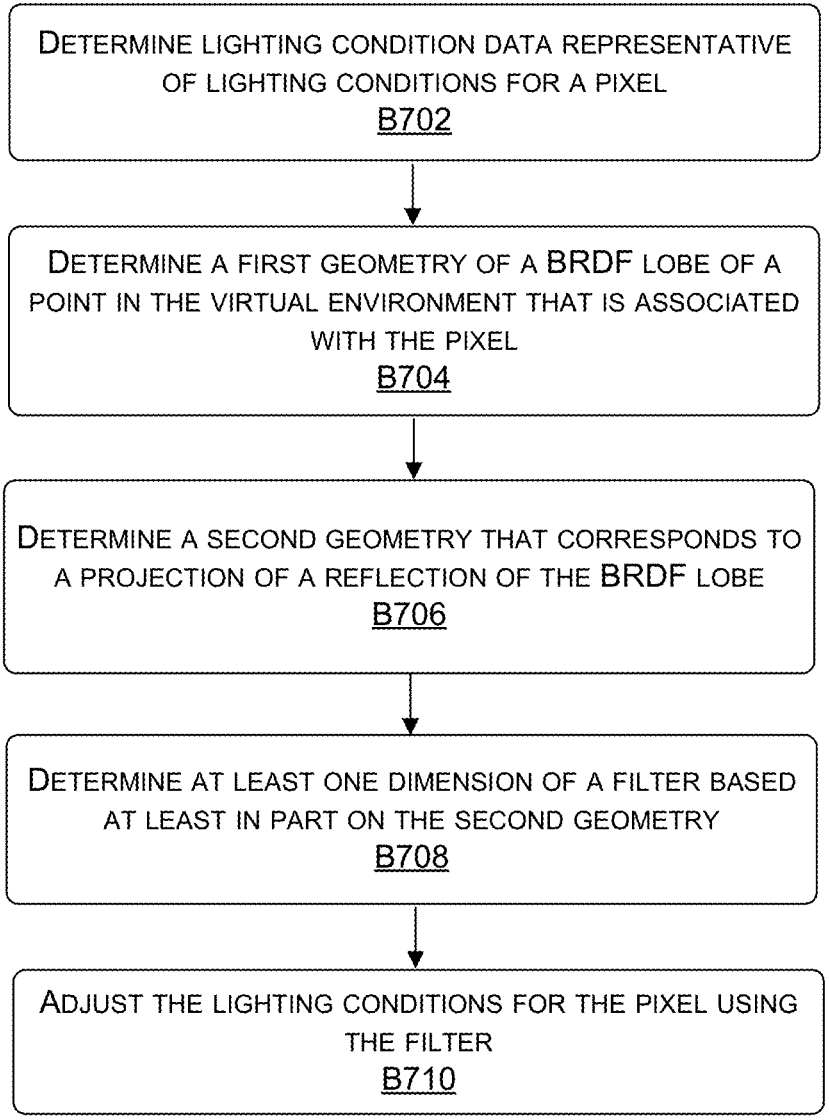
FIG. 7 is a flow diagram showing a method for determining a filter for denoising reflections, in accordance with some embodiments of the present disclosure.

FIG. 7 is a flow diagram showing a method 700 for determining a filter for denoising reflections, in accordance with some embodiments of the present disclosure. The method 700 may apply to the examples of any of FIGS. 2A-2E, or other examples. The method 700, at block B702, includes determining lighting condition data representative of lighting conditions for a pixel. For example, the image renderer 102 may determine lighting conditions for the pixel 132 of the image 116 or the image 114 of the virtual environment 200 using at least one incident ray (e.g., the ray 214) that extends to the point 216 on the surface 208 in the virtual environment 200 and a reflected ray (e.g., the ray 218) from the incident ray.

The method 700, at block B704, includes determining a first geometry of a BRDF lobe of a point in the virtual environment that is associated with the pixel. For example, the geometry determiner 104 may determine, based at least in part on the NDF of the NDF range 220 associated with the point 216, first geometry of the BRDF lobe of the point 216.

The method 700, at block B706, includes determining a second geometry that corresponds to a projection of a reflection of the BRDF lobe. For example, the geometry determiner 104 may determine based at least in part on the first geometry of the BRDF lobe 230, a second geometry that corresponds to the projection 250 of the reflection 252 of the BRDF lobe 230 across the surface 208 to the screen 204 towards a location corresponding to the pixel 212 or the pixel 132.

The method 700, at block B708, includes determining at least one dimension of a filter based at least in part on the second geometry. For example, the geometry determiner 104 and/or the image filterer 108 may determine one or more of the width 310, the width 320, the filter direction 136, the filter direction 138, or the filter weight values of the filter 120—based at least in part on the second geometry.

The method 700, at block B710, includes adjusting the lighting conditions for the pixel using the filter. For example, the image filterer 108 may apply the filter 120 to image data representative of the virtual environment 200 to produce the image 116.

Figure 8:
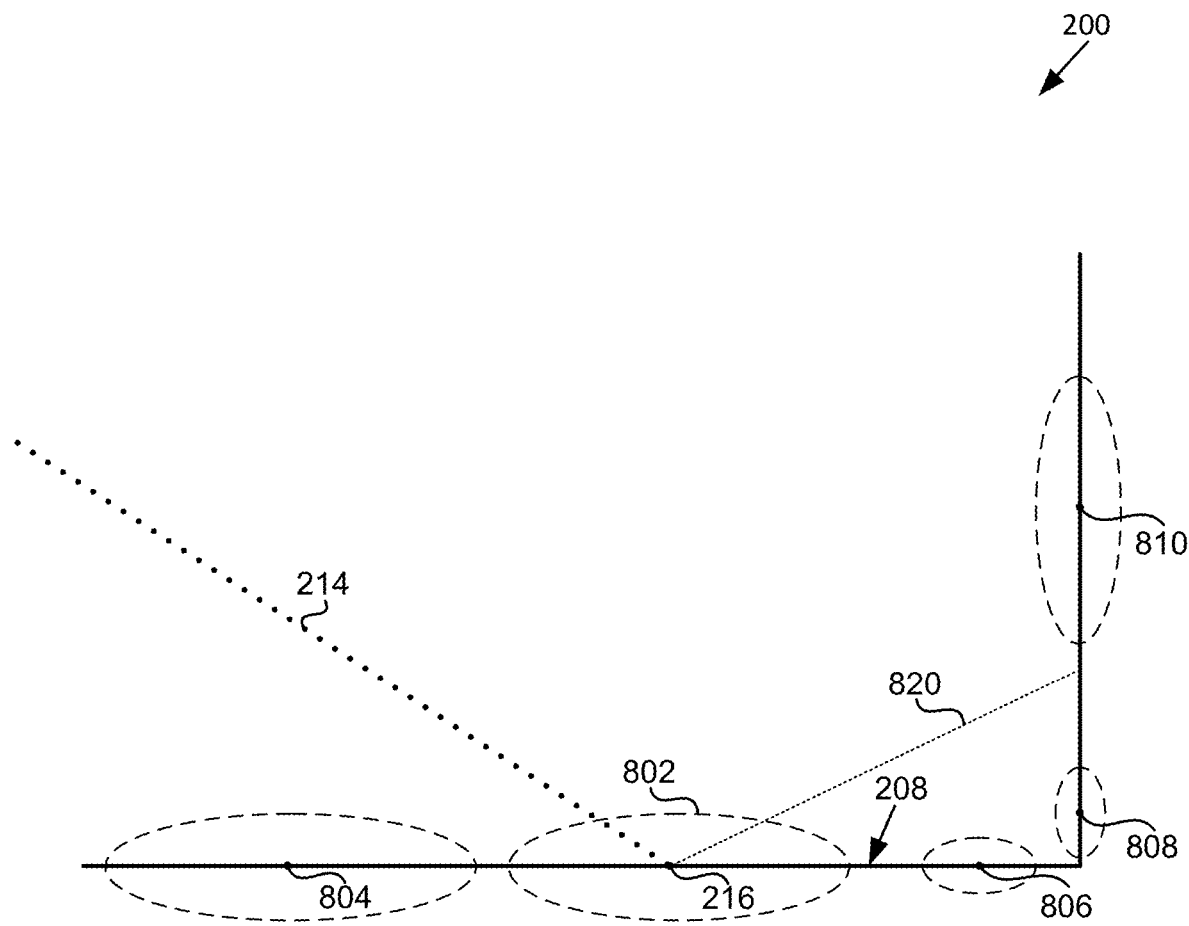
FIG. 8 is a diagram illustrating an example of determining a filter, which may be used to for denoising ambient occlusion or global illumination, in accordance with some embodiments of the present disclosure.

Referring now to FIG. 8, FIG. 8 is a diagram illustrating an example of determining a filter, which may be used to for denoising ambient occlusions or global illuminations, in accordance with some embodiments of the present disclosure.

In some examples, the image renderer 102 determines a footprint 802 for a filter used to denoise diffuse signals (e.g., due to ambient occlusions or global illumination) in a world space of the virtual environment 200, as indicated in FIG. 8. The filter may be applied only to the indirect diffuse component of the lighting condition data. For example, direct lighting and shadows, or specular reflections may each be denoised using separate filters. Further, the filter may be similar to the filter 120, and the size, orientation, and/or shape of the filter may be determined based at least in part on projecting the footprint 802 from the word space of the virtual environment 200 to a screen space of the screen 204. For example, where the filter is for the pixel 212, the footprint 802 may be projected along the view vector 214 and/or towards the camera 202. Further, the view vector 214 may have been used to ray-trace ambient occlusions or global illuminations for the point 216 and the pixel 212, as an example. Filter directions and/or filter weights may be determined for the filter similar as for the filter 120. In some examples, the filter weights for the filter are calculated in the world space for denoising diffuse signals, due to, for example, ambient occlusion or global illumination.

Using ray-traced ambient occlusion or global illumination may be preferable in that it is querying the visibilities around surface points (e.g., points 216, 804, 806, 808, 810) in the virtual environment 200 by actually tracing rays (e.g., a ray 820, which may be referred to as an occlusion ray or secondary ray) against scene geometries, not just sampling a depth buffer. As a result, lighting condition data that corresponds to the ambient occlusions may be more spatially accurate than screen space techniques resulting in higher visual quality. Further, screen space techniques for implementing ambient occlusion or global illumination may darken the corner and edges of the virtual environment 200, and leave a dark halo around objects. These approaches may also fail at viewport boards, and may not be capable of handling occlusion from off-screen or in screen but occluded geometries.

Approaches described herein may produce, for a pixel, an anisotropic kernel filter of a filter that is used to denoise ray-traced global illumination and/or ambient occlusion lighting data, where the filter dimensions and weights accurately reflect the spatial characteristics of the virtual environment. Using this approach, the ray-traced global illumination and/or ambient occlusion lighting data may be denoised to accurately portray global illumination and/or ambient occlusion lighting in the image 116, even where the ray-traced global illumination and/or ambient occlusion lighting data is generated using a single ray-traced sample of a state of the virtual environment 200 that includes the ray 214 and the ray 820.

In further examples, the footprint 802 that may define a size of a kernel shape of the filter may be a sphere in the world space of the virtual environment 200, with the size being shorter in the direction parallel to the normal of the surface point (e.g., the point 216). This may be for applying the filter only across surface points in the virtual environment 200 that share the same plane (e.g., the points 216, 804, and 806).

According to further examples, the size of the filter may be adaptively varied based at least in part on (e.g., may be a function of) the closest ambient occlusion or global illumination ray hit distance (e.g., determined from the hit distance buffer used to render the image 114) or ray length (e.g., of the ray 820). For example, for each point 216 the image renderer 102 may cast any number of rays (e.g., the ray 820) for the point 216. Based at least in part on the length of the rays, the footprint 802 size and as a result the filter kernel size of the filter may be adapted. If a ray is short because it hit something nearby, a smaller filter size may result (e.g., a corner or nearby object), and if the ray is long a larger filter size may result (e.g., where the point 216 is in a more open region).

In further examples, the variance of the filter may be linearly adaptive. This may be beneficial in that, in more open regions, the visibility among the surface points may change slowly, and therefore more information can be shared amongst filters that correspond to the points. Thus, the footprint 230 may be larger. On the other hand, the visibility among the surface points may change rapidly in a region with close contact, and the filter size may be smaller as less information can be shared amongst filters that correspond to the points. For example, as shown in FIG. 8, the points 804, 216, and 810 are in more open regions than the points 806 and 808, resulting in larger footprints for the points 804, 216, and 810. This approach may significantly improve the contact occlusion and prevent overblur in the image 116.

Bilateral filters that are determined by the filter determiner 106 using these approaches may be applied by the image filterer 108 separately in real-time rendering applications. This may enhance performance, but lead to some artifacts at object boundaries. The appearance of the artifacts may be mitigated, in some examples, by combining the adaptively varied filter size with a multiple filter iteration. Unlike conventional multiple filter solutions, the world space filter may be changed per iteration since all the estimated size is also in world space.

Further, similar as for ray-traced reflections, in some examples, the geometry determiner 104 may determine the size of the filter 120 and/or one or more geometries thereof based at least in part on an amount of rays (e.g., ray-traced samples) used to determine lighting conditions of the for the pixel 132 and/or the pixel 212. For example, the present disclosure may provide for accurate reflections using a single ray-traced sample of a state of the virtual environment 200 that includes the ray 214 and the ray 218. Where more than one ray-traced sample is used, the geometry determiner 104 may compute the size and/or one or more geometries of the filter 120, such that the size and/or one or more geometries decrease based on (e.g., proportionally with) the number of samples (and/or reflected rays and/or eye rays). A suitable adjustment factor for the size and/or one or more geometries may be computed by the geometry determiner 104 as $1/\sqrt{n}$, where n is the number of ray-traced samples.

Also, the image renderer 102 may use at least one ray-traced sample of at least one previous state of the virtual environment 200 (e.g., each state may correspond to a rendered frame representative of the virtual environment 200) to determine lighting conditions for the pixel 132 and/or the pixel 212 at a subsequent state of the virtual environment 200. For example, any number of temporal ray-traced samples may be used to determine lighting conditions for the pixel 132 and/or the pixel 212 in addition to the one or more spatial or current ray-traced samples used to determine the lighting conditions for the pixel 132 and/or the pixel 212 (e.g., using a temporal filter that may use the geometry of the filter 120). Where a number of temporal ray-traced samples are used, those samples may be counted toward the number of ray-traced samples n, or may otherwise be used to reduce the size and/or one or more geometries of the filter 120.

Figure 9:
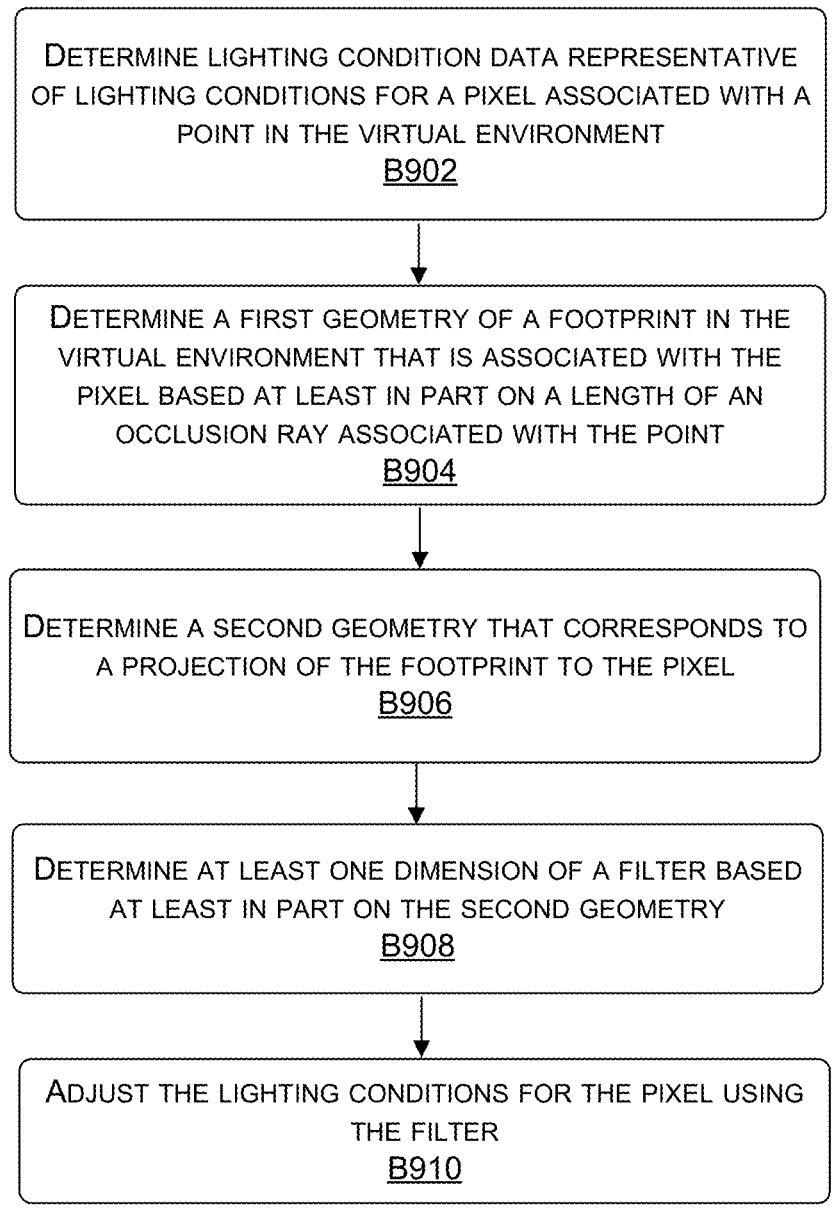
FIG. 9 is a flow diagram showing a method for determining a filter for denoising ambient occlusion of global illumination, in accordance with some embodiments of the present disclosure.

FIG. 9 is a flow diagram showing a method 900 for determining a filter for denoising ambient occlusions or global illuminations, in accordance with some embodiments of the present disclosure. The method 900 may apply to the example of FIG. 8, or other examples. The method 900, at block B902, includes determining lighting condition data representative of lighting conditions for a pixel associated with a point in the virtual environment. For example, the image renderer 102 may determine lighting conditions for the pixel 212 and/or the pixel 132 using at least one camera ray (e.g., the ray 214) that extends to the point 216 on the surface 208 in the virtual environment 200 and an occlusion ray (e.g., the ray 820) from the point 216.

The method 900, at block B904, includes determining a first geometry of footprint in the virtual environment that is associated with the pixel based at least in part on a length of an occlusion ray associated with the point. For example, the geometry determiner 104 may determine, based at least in part on the length of the ray 820, a size of the footprint 820.

The method 900, at block B906, includes determining a second geometry that corresponds to a projection of a footprint to the pixel. For example, the footprint 820 may be projected to the screen 204 along the ray 214 to determine the second geometry, which may correspond to a size of a filter at the screen 204.

The method 900, at block B908, includes determining at least one dimension of a filter based at least in part on the second geometry. For example, the geometry determiner 104 and/or the image filterer 108 may determine one or more of the width 310, the width 320, the filter direction 136, the filter direction 138, or the filter weight values of the filter—based at least in part on the second geometry.

The method 900, at block B910, includes adjusting the lighting conditions for the pixel using the filter. For example, the image filterer 108 may apply the filter to image data representative of the virtual environment 200 to produce the image 116. As with reflections, the filter may be applied similar as the filter 120, but to the indirect diffuse component of the lighting condition data. Further, similar to the filter 120, one filter may similarly be determiner and applied for each pixel of the screen 204.

Figure 10:
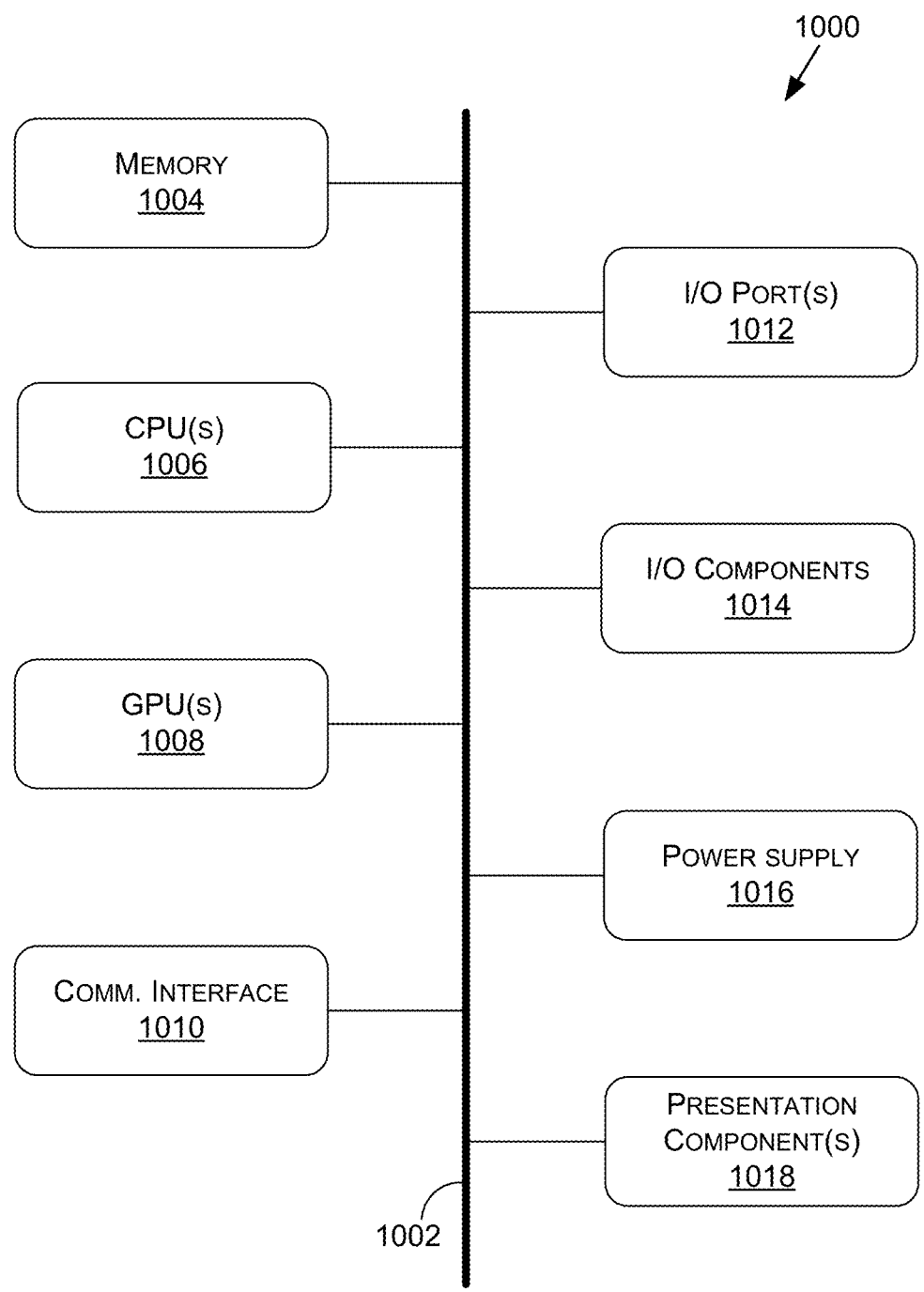
FIG. 10 is a block diagram of an example computing device suitable for use in implementing some embodiments of the present disclosure.

FIG. 10 is a block diagram of an example computing device 1000 suitable for use in implementing some embodiments of the present disclosure. Computing device 1000 may include a bus 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, and one or more presentation components 1018 (e.g., display(s)).

Although the various blocks of FIG. 10 are shown as connected via the bus 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The bus 1002 may represent one or more busses, such as an address bus, a data bus, a control bus, or a combination thereof. The bus 1002 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

The GPU(s) 1008 may be used by the computing device 1000 to render graphics (e.g., 3D graphics). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data. The display memory may be included as part of the memory 1004. The GPU(s) 1008 may include two or more GPUs operating in parallel (e.g., via a link). When combined together, each GPU 1008 may generate pixel data for different portions of an output image or for different output images (e.g., a first GPU for a first image and a second GPU for a second image). Each GPU may include its own memory, or may share memory with other GPUs.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    determining a point on a surface in a virtual environment based at least on an interaction of a ray with the point;
    comparing one or more roughness values associated with the surface to one or more threshold values;
    based at least on the comparing of the one or more roughness values to the one or more threshold values, sampling a portion of a bidirectional reflectance distribution function (BRDF) lobe for the point according to a sampling bias to determine lighting condition data for the point; and
    rendering one or more images corresponding to the virtual environment using the lighting condition data.

2. The method of claim 1, further including computing the sampling bias as a function of the one or more roughness values.

3. The method of claim 1, wherein the one or more threshold values are used to select between performing the sampling on the portion of the BRDF lobe to determine the lighting condition data and performing full sampling of the BRDF lobe to determine the lighting condition data.

4. The method of claim 1, wherein the one or more threshold values are used to select between performing the sampling on the portion of the BRDF lobe to determine the lighting condition data and evaluating the point using a mirrored surface reflective model to determine the lighting condition data.

5. The method of claim 1, wherein the portion of the BRDF lobe represents a subset of a probability space of the BRDF lobe.

6. The method of claim 1, wherein the ray is a view vector of a portion of a virtual light path that extends from a virtual screen in the virtual environment to the point, the virtual light path reflecting from the point to intersect an object of the virtual environment.

7. The method of claim 1, wherein the rendering of the one or more images includes applying a filter to the lighting condition data, the filter being anisotropic in a world space of the virtual environment.

8. The method of claim 1, wherein the rendering of the one or more images includes applying a filter to a first pixel and the method further includes determining second lighting condition data associated with a second pixel that is a neighbor to the first pixel using a Normal Distribution Function (NDF) weight, wherein the applying of the filter weights the second lighting condition data using the NDF weight.

9. A system comprising:
    one or more graphics processing units (GPUs) to perform operations based at least on executing instructions stored in memory, the operations comprising:
    determining one or more roughness values for a surface based at least on a point that corresponds to the surface in a virtual environment;
    selecting a portion of a bidirectional reflectance distribution function (BRDF) lobe for the point based at least on the one or more roughness values, the portion of the BRDF lobe representing a subset of a probability space of the BRDF lobe;
    based at least on the selecting, sampling the portion of the BRDF lobe according to a sampling bias to determine lighting condition data for the point; and
    rendering one or more images corresponding to the virtual environment using the lighting condition data.

10. The system of claim 9, wherein the operations further include computing the sampling bias as a function of the one or more roughness values.

11. The system of claim 9, wherein the selecting is between performing the sampling on the portion of the BRDF lobe to determine the lighting condition data and performing full sampling of the BRDF lobe to determine the lighting condition data.

12. The system of claim 9, wherein the selecting is between performing the sampling on the portion of the BRDF lobe to determine the lighting condition data and evaluating the point using a mirrored surface reflective model to determine the lighting condition data.

13. The system of claim 9, wherein the selecting is based at least on a comparison between the one or more roughness values and one or more threshold values.

14. The system of claim 9, wherein the sampling is based at least on a glossy microfacet BRDF model.

15. The system of claim 9, wherein the determining of the one or more roughness values is further based at least on an interaction of a view vector with the point, the view vector being a portion of a virtual light path that extends from a virtual screen in the virtual environment to the point, the virtual light path reflecting from the point to intersect an object of the virtual environment.

16. The system of claim 9, wherein the rendering of the one or more images includes applying a filter to the lighting condition data, the filter being anisotropic in a world space of the virtual environment.

17. A processor comprising:
one or more circuits to render one or more images using lighting condition data for a point in a virtual environment based at least on sampling a portion of a bidirectional reflectance distribution function (BRDF) lobe for the point according to a sampling bias, the sampling bias being determined based at least on a comparison of one or more roughness values for a surface corresponding to the point to one or more threshold values.

18. The processor of claim 17, wherein the one or more circuits are further to compute the sampling bias as a function of the one or more roughness values.

19. The processor of claim 17, wherein the sampling the portion of the BRDF lobe comprises selecting between performing the sampling on the portion of the BRDF lobe to determine the lighting condition data and performing a full sampling of the BRDF lobe to determine the lighting condition data.

20. The processor of claim 17, wherein the sampling the portion of the BRDF lobe comprises selecting between performing the sampling on the portion of the BRDF lobe to determine the lighting condition data and evaluating the point using a mirrored surface reflective model to determine the lighting condition data.

* * * * *